US011300326B2

(12) United States Patent
Ma et al.

(10) Patent No.: US 11,300,326 B2
(45) Date of Patent: Apr. 12, 2022

(54) SENSING AND FEEDBACK FOR ROW ON SUN TRACKING METHOD AND SYSTEM

(71) Applicant: NEXTracker Inc., Fremont, CA (US)

(72) Inventors: Yu Dong Ma, Richmond, CA (US); Yang Liu, Mountain View, CA (US); Francesco Borrelli, Kensington, CA (US); Allan Daly, Albany, CA (US); Ricardo Delgado-Nanez, San Jose, CA (US); Alexander W. Au, Oakland, CA (US)

(73) Assignee: NEXTRACKER INC., Fremont, CA (US)

( * ) Notice: Subject to any disclaimer, the term of this patent is extended or adjusted under 35 U.S.C. 154(b) by 88 days.

(21) Appl. No.: 16/788,171

(22) Filed: Feb. 11, 2020

(65) Prior Publication Data

US 2020/0182513 A1 Jun. 11, 2020

Related U.S. Application Data

(63) Continuation of application No. 15/645,989, filed on Jul. 10, 2017, now Pat. No. 10,557,646.

(60) Provisional application No. 62/492,870, filed on May 1, 2017, provisional application No. 62/419,383, filed on Nov. 8, 2016, provisional application No. 62/419,386, filed on Nov. 8, 2016, provisional application No. 62/360,857, filed on Jul. 11, 2016.

(51) Int. Cl.
*F24S 30/422* (2018.01)
*F24S 25/10* (2018.01)
*F24S 30/425* (2018.01)
*H02S 20/10* (2014.01)
*F24S 20/00* (2018.01)
*F24S 30/00* (2018.01)

(52) U.S. Cl.
CPC ............. *F24S 30/422* (2018.05); *F24S 25/10* (2018.05); *F24S 30/425* (2018.05); *F24S 2020/16* (2018.05); *F24S 2030/136* (2018.05); *F24S 2030/19* (2018.05); *H02S 20/10* (2014.12)

(58) Field of Classification Search
CPC ........ F24S 30/422; F24S 30/425; F24S 25/10; F24S 2030/136; F24S 2030/19; F24S 2020/16; H02S 20/10
See application file for complete search history.

(56) References Cited

U.S. PATENT DOCUMENTS

| 8,459,249 | B2 | 6/2013 | Corio |
| 2003/0034029 | A1 | 2/2003 | Shingleton |

(Continued)

FOREIGN PATENT DOCUMENTS

| KR | 100896332 B | 5/2009 |
| WO | 2012076949 A1 | 6/2012 |

OTHER PUBLICATIONS

International Search Report and Written Opinion for PCT/US2013/073948, filed on Dec. 9, 2013.

*Primary Examiner* — Que Tan Le
*Assistant Examiner* — Don J Williams
(74) *Attorney, Agent, or Firm* — Weber Rosselli & Cannon LLP

(57) ABSTRACT

A solar tracker system comprising a plurality of on sun trackers and a plurality of off sun tracker. Each tracker is selectively adjusted to achieve a desired power output of the solar power plant system in an example.

9 Claims, 41 Drawing Sheets

(56) References Cited

U.S. PATENT DOCUMENTS

| | | | |
|---|---|---|---|
| 2008/0308091 A1* | 12/2008 | Corio | F24S 30/425 |
| | | | 126/606 |
| 2010/0212653 A1 | 8/2010 | Mcdonald | |
| 2011/0092094 A1 | 4/2011 | Rueggen et al. | |
| 2012/0091077 A1 | 4/2012 | Zuritis | |
| 2012/0180845 A1 | 7/2012 | Cole et al. | |
| 2014/0196761 A1 | 7/2014 | Tilley et al. | |
| 2015/0092383 A1 | 4/2015 | Corio et al. | |

\* cited by examiner

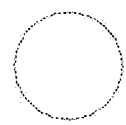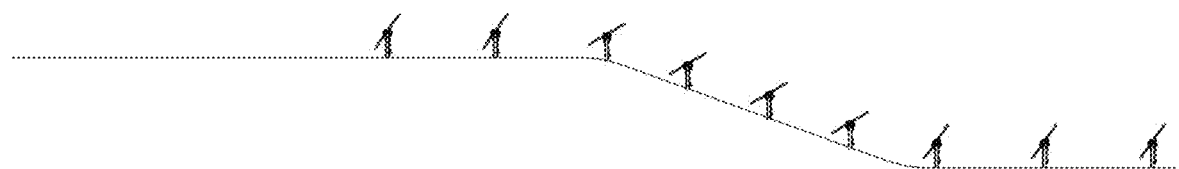
Figure 1

Figure 21

| Items | Design A | Design A' | Design B | Design B' |
|---|---|---|---|---|
| module length/mm | 2281 | 2281 | 2605 | 2349 |
| module width/mm | 211 | 200 | 179 | 170 |
| glass length/mm | 2275 | 2275 | 2599 | 2343 |
| glass width/mm | 205 | 194 | 173 | 164 |
| cell to cell gap/mm | 3 | 3 | 3 | 3 |
| Cell Type | 156.75 mono PERC | 156.75 mono PERC | 125.0 mono | 125.0 mono |
| Cell NO. | 12 | 12 | 18 | 16 |
| Voc/V | ≈7.9 | ≈7.9 | ≈11.5 | ≈10.3 |
| Vmpp/V | ≈6.6 | ≈6.6 | ≈9.8 | ≈8.7 |
| Impp/A | ≈9.2 | ≈9.2 | ≈7.1 | ≈7.1 |
| Pmpp/W | ≈61.0 | ≈61.0 | ≈70.0 | ≈61.0 |
| Min bypass length of Shadow/mm | 156.75 | 156.75 | 125 | 125 |
| diode | 3 | 2 | 3 | 2 |
| Certification | paper work is required | recertification is required | recertification is required | recertification is required |
| Major non-cell BOM Cost/$/pcs | 11.5222 | 11.0586 | 11.2882 | 10.2603 |
| Major non-cell BOM Cost/$/W | 0.1889 | 0.1813 | 0.1613 | 0.1682 |

Figure 24

| Items | Design C | Design C' | Design D | Design D' | Design E | Design E' | Design F | Design F' | Design F'' |
|---|---|---|---|---|---|---|---|---|---|
| module length/mm | 2203 | 2038 | 2203 | 2148 | 2193 | 2193 | 2203 | 2112 | 2052 |
| module width/mm | 211 | 200 | 211 | 200 | 179 | 170 | 211 | 200 | 200 |
| glass length/mm | 2197 | 2032 | 2197 | 2142 | 2187 | 2187 | 2197 | 2106 | 2046 |
| glass width/mm | 205 | 194 | 205 | 194 | 173 | 164 | 205 | 194 | 194 |
| cell to cell gap/mm | 3 | 3 | 3 | 3 | 3 | 3 | 3 | 2 | 2.5 |
| Cell Type | 156.75 mono PERC, split to 3 strip | 156.75 mono PERC, split to 3 strip | 156.75 mono, split to 3 strip | 156.75 mono, split to 3 strip | 125.0 mono, split to 3 strip | 125.0 mono, split to 3 strip | 156.75 mono, split to 4strip | 156.75 mono, split to 4strip | 156.75 mono, split to 4strip |
| cell NO. | 39 strips | 36 strips | 39 strips | 38 strips | 48 strips | 48 strips | 51 strip | 50 strip | 48 strip |
| Voc/V | ≈25.7 | ≈23.7 | ≈25.0 | ≈23.1 | ≈30.8 | ≈30.8 | ≈32.7 | ≈32.1 | ≈30.7 |
| Vmpp/V | ≈21.6 | ≈19.9 | ≈21.2 | ≈19.6 | ≈26.6 | ≈26.6 | ≈27.8 | ≈27.2 | ≈26.1 |
| Impp/A | ≈3.1 | ≈3.1 | ≈3.0 | ≈3.0 | ≈2.25 | ≈2.25 | ≈2.23 | ≈2.23 | ≈2.23 |
| Pmpp/W | ≈66.0 | ≈61.0 | ≈63.0 | ≈58 | ≈60.0 | ≈60.0 | ≈62.0 | ≈60.0 | ≈58.2 |
| Min bypass length of Shadow/mm | 52.25 | 52.25 | 52.25 | 52.25 | 41.67 | 41.67 | 39.19 | 39.19 | 39.19 |
| diode | 3 | 2 | 3 | 2 | 3 | 2 | 3 | 2 | 2 |
| Certification | recertification is required | recertification is required | recertification is required | recertification is required | recertification is required | recertification is required | recertification is required | recertification is required | recertification is required |
| Major non-cell BOM Cost/$/pcs | 11.4296 | 10.5116 | 9.9447 | 9.5161 | 10.4001 | 9.9760 | 9.8997 | 9.3909 | 9.1833 |
| Major non-cell BOM Cost/$/W | 0.1732 | 0.1723 | 0.1579 | 0.1641 | 0.1733 | 0.1663 | 0.1597 | 0.1565 | 0.1578 |

Figure 25

| Items | Design G | Design G' |
|---|---|---|
| module length/mm | 2068 | 1987 |
| module width/mm | 364 | 364 |
| glass length/mm | 2062 | 1981 |
| glass width/mm | 358 | 358 |
| cell to cell gap/mm | 3 | 3 |
| Cell Type | 156.75 mono, split to 2strip | 156.75 mono, split to 2strip |
| Cell NO. | 24*2 strip | 23*2 strip |
| Voc/V | ≈30.61 | ≈29.33 |
| Vmpp/V | ≈25.1 | ≈24.0 |
| Impp/A | ≈4.31 | ≈4.31 |
| Pmpp/W | ≈108.0 | ≈104.0 |
| Min bypass length of Shadow/mm | 78.38 | 78.38 |
| diode | 3 | 3 |
| Certification | recertification is required | recertification is required |
| Major non-cell BOM Cost/$/pcs | 16.2052 | 15.8223 |
| Major non-cell BOM Cost/$/W | 0.1500 | 0.1521 |

Figure 26 (Continued)

| Items | Horizontal layup | Vertical layup |
|---|---|---|
| module length/mm | 1956 | 1956 |
| module width/mm | 1010 | 992 |
| Certification | Re-test certification cost:21000EUR | NA |
| Major non-cell BOM Cost ($/W) | 0.1020 | 0.0999 |
| Major non-cell BOM Cost ($/module) | 36.6627 | 35.9711 |

Figure 28

- Flash test procedure:
  - Step 1: Without shielding
  - Step 2: Shield cell 01
  - Step 3: Shield cell 20
  - Step 4: Shield cell 36

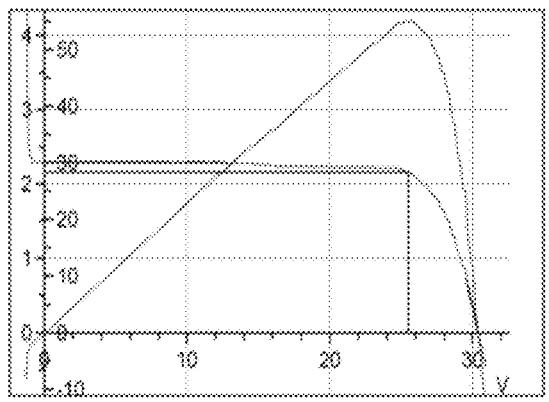 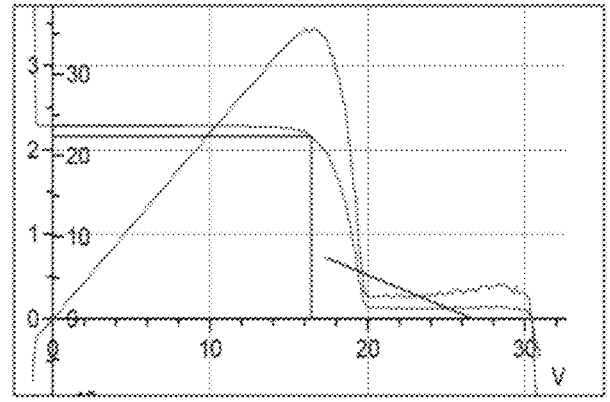
Figure 33

| Design | 1/2 | 1/3 | 1/4 |
|---|---|---|---|
| Dimension | 2052mm X 200mm | 2052mm X 200mm | 2052mm X 200mm |
| Power (W) | 53-56 | 53-56 | 53-56 |
| Full output (V) | 12.5 | 18 | 25 |
| Shaded output (V) | 8 | 12 | 16 |
| Manufacturing | Higher quality with automated soldering | Possible auto soldering, but very limited in supplier | Potential quality issue due to manual soldering |
| Cost * | | $32-$36 | $32-$36 |

Figure 34

SENSING AND FEEDBACK FOR ROW ON SUN TRACKING METHOD AND SYSTEM

CROSS-REFERENCE TO RELATED APPLICATIONS

This application is a continuation of U.S. patent application Ser. No. 16/788,171 filed Feb. 11, 2020, which is a continuation of U.S. patent application Ser. No. 15/645,989 filed Jul. 10, 2017, now U.S. Pat. No. 10,557,646, which claims priority to U.S. Provisional Application Nos. 62/360,857 filed Jul. 11, 2016, 62/419,383 filed Nov. 8, 2016, 62/419,386 filed Nov. 8, 2016, and 62/492,870 filed May 1, 2017, each of which is incorporated by reference in its entirety.

BACKGROUND

The present application relates generally to a tracking system for solar panels. More specifically, embodiments of the present invention provide tracking systems that are suitable for solar panels. In a specific embodiment, a tracking system according to the present invention is fully configurable in relation to each other, among other aspects. There are other embodiments as well.

As the population of the world increases, industrial expansion has lead to an equally large consumption of energy. Energy often comes from fossil fuels, including coal and oil, hydroelectric plants, nuclear sources, and others. As an example, the International Energy Agency projects further increases in oil consumption, with developing nations such as China and India accounting for most of the increase. Almost every element of our daily lives depends, in part, on oil, which is becoming increasingly scarce. As time further progresses, an era of "cheap" and plentiful oil is coming to an end. Accordingly, other and alternative sources of energy have been developed.

Concurrent with oil, we have also relied upon other very useful sources of energy such as hydroelectric, nuclear, and the like to provide our electricity needs. As an example, most of our conventional electricity requirements for home and business use come from turbines run on coal or other forms of fossil fuel, nuclear power generation plants, and hydroelectric plants, as well as other forms of renewable energy. Often times, home and business use of electrical power has been stable and widespread.

Most importantly, much if not all of the useful energy found on the Earth comes from our sun. Generally, all common plant life on the Earth achieves life using photosynthesis processes from sun light. Fossil fuels such as oil were also developed from biological materials derived from energy associated with the sun. For human beings including "sun worshipers," sunlight has been essential. For life on the planet Earth, the sun has been our most important energy source and fuel for modern day solar energy.

Solar energy possesses many characteristics that are very desirable! Solar energy is renewable, clean, abundant, and often widespread. Certain technologies have been developed to capture solar energy, concentrate it, store it, and convert it into other useful forms of energy.

Solar panels have been developed to convert sunlight into energy. As an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successfully for certain applications, there are still limitations. Often, solar panels are unable to convert energy at their full potential due to the fact that the sun is often at an angle that is not optimum for the solar cells to receive solar energy. In the past, various types of conventional solar tracking mechanisms have been developed. Unfortunately, conventional solar tracking techniques are often inadequate. These and other limitations are described throughout the present specification and may be described in more detail below.

From the above, it is seen that techniques for improving solar systems are highly desirable.

SUMMARY OF THE INVENTION

The present application relates generally to a tracking system for solar panels. More specifically, embodiments of the present invention provide tracking systems that are suitable for solar panels. In a specific embodiment, a tracking system according to the present invention is fully configurable in relation to each other, using sensing and feedback devices, among other aspects. There are other embodiments as well.

In an example, the present invention provides a tracker system. The system has a first tracker apparatus comprising a first row of a plurality of solar modules, each of the solar modules being spatially configured to face in a normal manner in an on sun position in an incident direction of electromagnetic radiation derived from the sun; and a second tracker apparatus comprising second row of a plurality of solar modules, each of which is configured in an off sun direction such that each of the solar modules does not block and shade any one of the plurality of solar modules from the first row.

In an example, the system has an optimized power output. The system also has the first solar tracker apparatus is one of a plurality of on sun tracker apparatuses. The system has the second solar tracker apparatus is one of a plurality of off sun tracker apparatuses. In an example, each of the solar trackers in the off sun position is adjacent to a pair of trackers in an off sun position.

In an example, a measuring device will on each row will identify when a row starts to become shaded and it will be recorded by the system. In an example, the system uses row to row information to optimize a tracking angle based on local conditions, such as, for example, sloping hills and changing ground cover ratios or other non-uniformities. In an example, the system will optimize for shading that my only be from East or West (morning or evening), although there can be other variations. In an example, each module can also the measuring device.

In an example, the present invention provides a solar power plant system. The system has a plurality of solar tracker apparatus, each of the solar tracker apparatus having a plurality of solar modules. The system has a controller device coupled to each of tracker apparatus, at least one drive device coupled to each of the tracker apparatus and operably coupled to the controller device, and optionally, a solar power strip coupled to the controller device, and provided to generate supply power to the controller device and the drive device. In an example, the solar power strip has a width of about 1/10$^{th}$ or more of a length of the solar power strip. In an example, the solar power strip is configured between a pair of solar modules in each of the tracker apparatus. The system has a network interface coupled to each of the controller devices, and a main controller device coupled to each of the controller devices using the network interface. The system has a wide area network connection coupled to the main controller device, and coupled to an external weather forecasting source using the wide area network, a plant control module stored in a memory device coupled to the main controller device, a first data source for information regarding detailed site geometry comprising a three coordinate information, and a second data source for the external weather forecasting source and coupled to the wide area network. The system has an irradiance sensor coupled main controller device, the irradiance sensor being configured with the system to capture at least local weather information for a desired time period in association with the solar power plant system.

In further examples, the present method and system can be illustrated using the following examples.

Sloping hill with morning versus evening. In an example, illustrations can be found first with shading, then corrected angle without shading.

Different ground cover ratio with morning versus evening. In an example, illustrations can be found first with shading, then corrected angle without shading.

In other illustrations, a measuring device as a narrow module that extends past standard modules is provided. In an example, acceptable shading of narrow module where tips are shaded, are included. In an example, non-acceptable shading of narrow module where shading then reaches to the standard module is included. Further details of the solar tracker system are described throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIGS. 1 through 22 illustrate a plurality of tracking systems configured for row on sun, using differing tracker positions configured with sensing and feedback devices, according to an embodiment of the present invention.

FIG. 23 through 35 illustrate a solar power strip and related information according to an embodiment of the present invention.

DESCRIPTION OF THE SPECIFIC EMBODIMENTS

Figure 2:
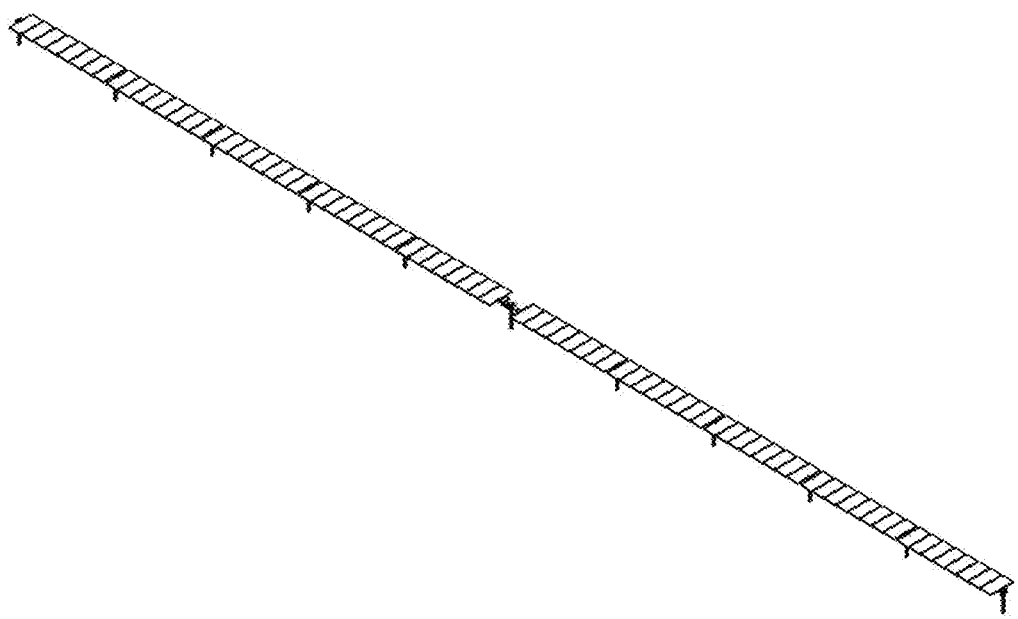

The present application relates generally to a tracking system for solar panels. More specifically, embodiments of the present invention provide tracking systems that are suitable for solar panels. There are other embodiments as well. Further details of the energy storage unit are described throughout the present specification and more particularly below. Such energy storage unit can be configured with a self-powered solar tracker, as described.

In a specific embodiment, the present disclosure provides a tracker apparatus for solar modules. The tracker apparatus has a first pier including a first hanger assembly and a second pier including a drive assembly including a drive mount. The drive mount is capable of compensating for construction tolerances in at least three axes and is configured to a drive device. The drive device has an off-set clamp device coupled to a cylindrical bearing device coupled to a clamp housing member. The tracker apparatus has a cylindrical torque tube operably disposed on the first pier and the second pier. The cylindrical torque tube includes a first end and a second end, and a notch. The notch is one of a plurality of notches spatially disposed along a length of the cylindrical torque tube. The tracker apparatus has a clamp configured around an annular portion of the cylindrical torque tube and mate with the notch to prevent movement of the clamp. The clamp includes a support region configured to support a portion of a solar module.

In an example, the self-powered solar tracker apparatus has a drive device. The apparatus has a crank coupled to the drive device and configured in an offset manner to a first end of a continuous torque tube, which has a plurality of torque tubes, each of the torque tubes being cylindrical in shape. In example, the apparatus has a frame assembly coupled to the continuous torque tube. In an example, the frame assembly coupled to a plurality of solar modules. In an example, the apparatus has a clamp assembly comprising a housing configured to be coupled to a second end of the continuous torque tube such that the continuous torque tube is suspended from the housing. In an example, the housing comprises an opening having a major plane normal to a length of the continuous torque tube. In an example, the opening comprises a first inner region and a second inner region, the first inner region acts as a first stop for the continuous torque tube when moved in a first radial direction until contact with the first inner region, and the second inner region acts as a second stop for the continuous torque tube when moved in a second radial direction until contact with the second inner region. In an example, the drive motor is operable to move the torque tube about a center of rotation and is substantially free from a load and moves the torque tube about the center of rotation at substantially a same force from a first radial position to a second radial position. In an example, the center of rotation is offset from a center of the continuous torque tube via the crank configured in the offset manner. Further details are provided throughout the present specification and more particularly below.

In an alternative embodiment, the present disclosure provides an alternative solar tracker apparatus. The tracker apparatus has a drive device, a crank coupled to the drive device and configured in an offset manner to a frame assembly. The frame assembly is coupled to a plurality of solar modules.

In an embodiment, the tracker apparatus has a continuous torque tube spatially disposed from a first region to a second region. The crank includes a first crank coupled to a first side of the drive device and a second crank coupled to a second side of the drive device. A first torque tube is coupled to the first crank and a second torque tube is coupled to the second crank. A first swage fitting couples the first crank to the first torque tube and a second swage fitting couples the second crank to the second torque tube. The tracker apparatus also has a second pier coupled to the drive device. In an embodiment, the tracker apparatus also has a drive mount coupled to the second pier.

In an alternative embodiment, the present disclosure provides an alternative solar tracker apparatus. The tracker apparatus has an adjustable hanger assembly aligned with a center of mass and configured with a clam shell clamp housing member assembly on the adjustable hanger assembly and a cylindrical torque tube including a plurality of torque tubes configured together in a continuous length from a first end to a second end such that the center of mass is aligned with a center of rotation of the cylindrical torque tubes to reduce a load of a drive motor operably coupled to the cylindrical torque tube.

In an embodiment, the drive motor is operable to move the torque tube about the center of rotation and is substantially free from a load. The center of rotation is offset from a center of the cylindrical torque tube.

In an alternative embodiment, the present disclosure provides a solar tracker apparatus. The tracker apparatus has a clamp housing member configured in an upright direction. The clamp housing member includes a lower region and an upper region. The lower region is coupled to a pier structure, and the upper region includes a spherical bearing device. The upright direction is away from a direction of gravity. The tracker apparatus has a clam shell clamp housing member coupled to the spherical bearing and a torque tube coupled to the spherical bearing device to support the torque tube from the upper region of the clamp housing member. The torque tube is configured in an off-set position from a center region of rotation.

In an embodiment, the tracker apparatus is configured substantially free from any welds during assembly. Reduced welding lowers cost, improves installation time, avoids errors in installation, improves manufacturability, and reduces component count through standardized parts. The torque tube is coupled to another torque tube via a swage device within a vicinity of the clam shell clamp housing member. In an embodiment, the connection is low cost, and provides for strong axial and torsional loading. The tracker apparatus is quick to install with the pokey-yoke design.

The torque tube is coupled to an elastomeric damper in line to dampen torque movement to be substantially free from formation of a harmonic waveform along any portion of a plurality of solar panels configured to the torque tube. The tracker apparatus also has a locking damper or rigid structure to configure a solar panel coupled to the torque tube in a fixed tilt position to prevent damage by securing the solar panel in a position that is substantially free from fluttering in an environment with high movement of air.

The tracker apparatus further includes a controller tracker apparatus configured in an inverter box provided in an underground region to protect the controller tracker apparatus. The tracker apparatus has a drive device to linearly actuate the torque tube. In an embodiment, the tracker apparatus uses an electrical connection coupled to a drive device.

In an embodiment, the spherical bearing device allows for accommodation of a construction tolerance, tracker movement, and acts as a bonding path of least resistance for taking an electrical current to ground.

The tracker apparatus can be one of a plurality of tracker apparatus configured in an array within a geographic region. Each of the plurality of tracker apparatus is driven independently of each other to cause each row to stow independently at a different or similar angle.

Still further, the present disclosure provides a tracker apparatus including a clam shell clamp, which has a first member operably coupled to a second member to hold a torque tube in place.

In an embodiment, the tracker apparatus also has a clamp housing member operably coupled to the clam shell clamp via a spherical bearing device such that the spherical bearing device includes an axis of rotation. The axis of rotation is different from a center of the torque tube. The tracker apparatus further includes a solar module coupled to the torque tube.

In an embodiment, the disclosure provides a tracker apparatus including a plurality of torque tubes including a first torque tube coupled to a second torque tube coupled to an Nth torque tube, wherein N is an integer greater than 2. Each pair of torque tubes is coupled to each other free from any welds.

In an embodiment, each pair of torque tubes is swage-fitted together. Each of the torque tubes is cylindrical in shape. Each of the plurality of torque tubes is characterized by a length greater than 80 meters. Each of the torque tubes includes a plurality of notches. In an embodiment, the tracker apparatus also has a plurality of U-bolt devices coupled respectively to the plurality of notches. Each of the plurality of torque tubes are made of steel.

In an alternative embodiment, the present disclosure provides a tracker apparatus having a pier member including a lower region and an upper region. A clamp holding member is configured to the upper region and is capable of moving in at least a first direction, a second direction opposite to the first direction, a third direction normal to the first direction and the second direction, a fourth direction opposite to the third direction, a fifth direction normal to the first direction, the second direction, the third direction, and the fourth direction, and a sixth direction opposite to the fifth direction.

In yet an alternative embodiment, the present disclosure provides a solar tracker apparatus. The tracker apparatus has a clamp housing member configured in an upright direction. The clamp housing member includes a lower region and an upper region. The lower region is coupled to a pier structure. The upper region includes a spherical bearing device. The upright direction is away from a direction of gravity. The tracker apparatus has a clam shell clamp housing member coupled to the spherical bearing and the clam shell clamp housing member being suspended from the spherical bearing. In an example, the bearing can also by cylindrical, or fixed within a support structure, which allows the torque tube to hang freely. In an embodiment, the tracker apparatus has a torque tube including a first end and a second end. The first end is coupled to the spherical bearing device to support the torque tube from the upper region of the clamp housing member. The torque tube is configured in an off-set position from a center region of rotation. The tracker apparatus has a drive device coupled to the second end such that the drive device and the torque tube are configured to be substantially free from a twisting action while under a load, e.g., rotation, wind, other internal or external forces.

In an embodiment, the present disclosure provides a solar tracker apparatus. In an embodiment, the tracker apparatus includes an adjustable hanger assembly aligned with a center of mass and configured with a clam shell clamp housing member assembly on the adjustable hanger assembly and a cylindrical torque tube including a plurality of torque tubes configured together in a continuous length from a first end to a second end such that the center of mass is aligned with a center of rotation of the cylindrical torque tubes to reduce a load of a drive motor operably coupled to the cylindrical torque tube. Further details of the present example, among others, can be found throughout the present specification and more particularly below.

In an example, the present invention provides a solar tracker system configured with an energy storage unit. The system has a tracker apparatus, comprising a torque tube extending from a first end to a second end. The system has at least a pair of pillars supporting a length of the torque tube, and a plurality of solar panels disposed spatially along the torque tube from the first end to the second end, each of the plurality of solar panels having an aperture region and a backside region. The system has an energy storage unit spatially disposed between the pair of pillars, and underlying the backside region of each of the plurality of trackers, the energy storage unit comprising an anode, a cathode, and an electrolyte disposed between the anode and the cathode. The system has a first output terminal coupled to the anode; and a second output terminal coupled to the cathode and a voltage defined between the first output terminal and the second output terminal. The system has an inverter device coupled to the first output terminal and the second output terminal, the inverter device being capable of converting a DC input into an AC output. The system has a width of about 1.5 feet, a height of about 1.5 feet, and a length of about 20 feet about 30 feet characterizing a volume of the energy storage unit. The system also has a controller device coupled to the tracker apparatus, the energy storage unit, and the inverter device, and a power grid; the controller device comprising an input power terminal, the input power terminal being coupled to the energy storage unit.

In an example, the electrolyte comprises a liquid material, the liquid material. In an example, the electrolyte comprises a lithium bearing material. In an example, the inverter device comprises a DC to AC micro-inverter. In an example, the controller device is coupled to a main controller. In an example, the energy storage unit comprises a plurality of battery units. In an example, the tracker apparatus is fixed or movable tracker. In an example, the controller device is coupled to the energy storage device using the inverter device to provide an input voltage of 24 volt DC. Further details of the present example, among others, can be found throughout the present specification and more particularly below.

As shown, the present disclosure provides a tracker apparatus for solar modules, and energy storage unit. In an embodiment, the solar modules can be a silicon based solar module, a poly silicon based solar module, a concentrated solar module, or a thin film solar module, including cadmium telluride (CdTe), copper indium gallium selenide ($CuIn_{1-x}Ga_xSe_2$ or CIGS), which is a direct bandgap semiconductor useful for the manufacture of solar cells, among others. As shown, each of the solar panels can be arranged in pairs, which form an array. Of course, there can be other variations. In an embodiment, the first pier and the second pier are provided on a sloped surface, an irregular surface, or a flat surface. A first pier and a second pier are two of a plurality of piers provided for the tracker apparatus 100. In example, the tracker apparatus has a solar module held in a hanging position or a supporting position.

The tracker apparatus has a first pier including a first hanger assembly and a second pier including a drive assembly. In an embodiment, the first pier is made of a solid or patterned metal structure, such as a wide beam flange or the like, as shown. In an embodiment, each of the piers is inserted into the ground, and sealed, using cement or other attachment material. Each pier is provided in generally an upright position and in the direction of gravity, although there can be variations. In an embodiment, each of the piers is spatially spaced along a region of the ground, which may be flat or along a hillside or other structure, according to an embodiment. In an embodiment, the first pier includes a wide flange beam. In an embodiment, the first pier and the second pier can be off-set and reconfigurable.

In an embodiment, the drive assembly is capable for construction tolerances in at least three axes and includes a drive mount that is configured to a drive device. The drive device has an off-set clamp device coupled to a cylindrical bearing device coupled to a clamp housing member.

In an embodiment, the tracker apparatus has a cylindrical torque tube operably disposed on the first pier and the second pier. In an embodiment, the cylindrical torque tube includes a one to ten-inch diameter pipe made of Hollow Structure Steel (HSS) steel. The cylindrical torque tube includes a first end and a second end, and a notch. The notch is one of a plurality of notches spatially disposed along a length of the cylindrical torque tube.

In an embodiment, the tracker apparatus has a clamp configured around an annular portion of the cylindrical torque tube. The clamp mates with the notch to prevent movement of the clamp. The clamp includes a support region configured to support a portion of a solar module. The clamp includes a pin configured with the notch. The tracker apparatus also has a rail configured to the clamp. The rail includes a thread region configured to hold a bolt, which is adapted to screw into the thread and bottom out against a portion of cylindrical torque tube such that the clamp is desirably torqued against the cylindrical torque tube. The tracker apparatus has a solar module attached to the rail or other attachment device-shared module claim or other devices. The cylindrical torque tube is one of a plurality of torque tubes configured in as a continuous structure and extends in length for 80 to 200 meters. Each pair of torque tubes is swage fitted together and bolted for the configuration.

In an embodiment, the tracker apparatus also has a center of mass along an axial direction that is matched with a pivot point of the drive device. The pivot point of the drive device is fixed in three dimensions while rotating along the center of mass. In an embodiment, the off-set clamp includes a crank device. The first hanger assembly includes a spherical bearing device configured a clam-shell clamp device to secure the first end to the cylindrical torque tube. In other examples, the drive device includes a slew gear. The tracker apparatus also has an overrun device configured with the first hanger assembly. The overrun device includes a mechanical stop to allow the cylindrical torque tube to rotate about a desired range.

FIGS. 1 through 22 illustrate a plurality of tracking systems configured for row on sun, using differing tracker positions, and a measuring device, according to an embodiment of the present invention. As shown, the system has a plurality of trackers, each of which is configured in a terrain having an uneven slope, as shown in FIG. 1. In an example, each of the trackers is tuned taking into consideration shading influences from adjacent trackers, geological terrain, weather, including local and global, time of day, and other influences, which will be described more fully below.

In an example, the tracker system has at least a first tracker apparatus comprising a first row of a plurality of solar modules. In an example, each of the solar modules is spatially configured to face in a normal manner in an on sun position in an incident direction of electromagnetic radiation derived from the sun. The system has a second tracker apparatus having a second row of a plurality of solar modules. In an example, each of the solar modules is configured in an off sun direction such that each of the solar modules does not block and shade any one of the plurality of solar modules from the first row using feedback from a measuring device coupled to second tracker device.

In an example, the first solar tracker apparatus is one of a plurality of on sun tracker apparatuses. In an example, the second solar tracker apparatus is one of a plurality of off sun tracker apparatuses. Each of the solar trackers is in the off-sun position is adjacent to a pair of trackers in an on sun position in an example, but can be in other configurations to achieve a desired power output of the solar plant.

Figure 3:
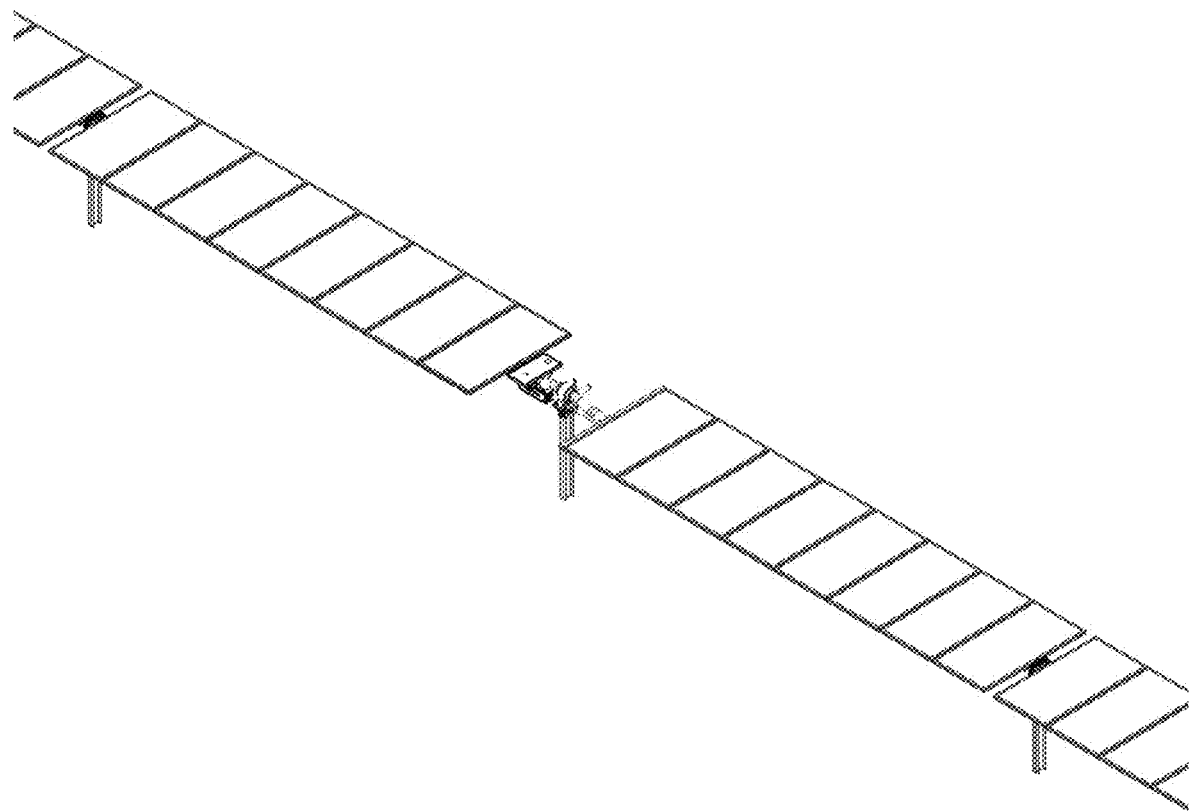
Figure 4:
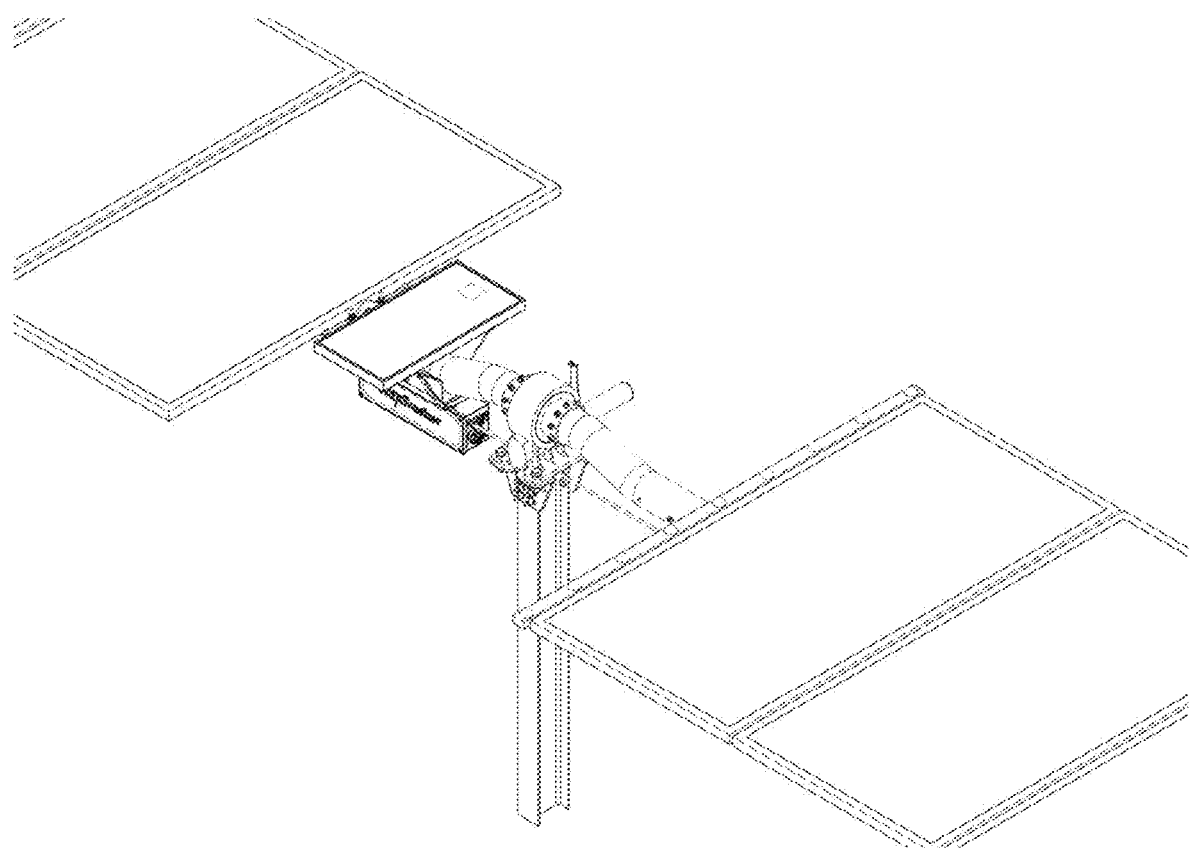
Figure 5:
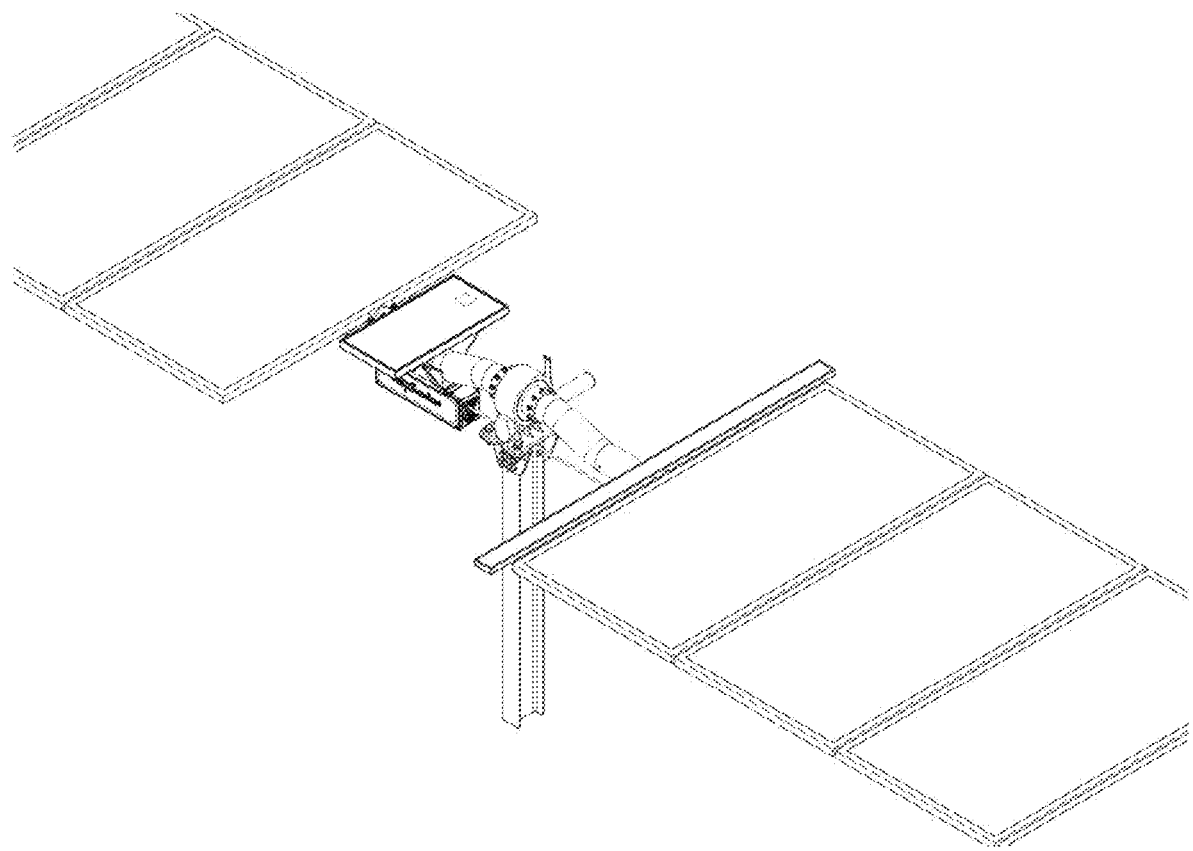
Figure 6:
Figure 7:
Figure 8:
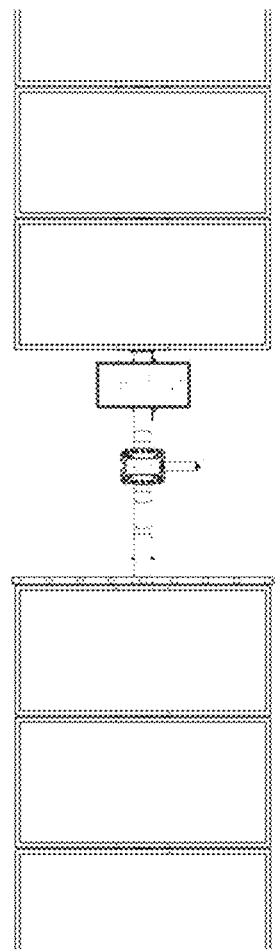
Figure 9:
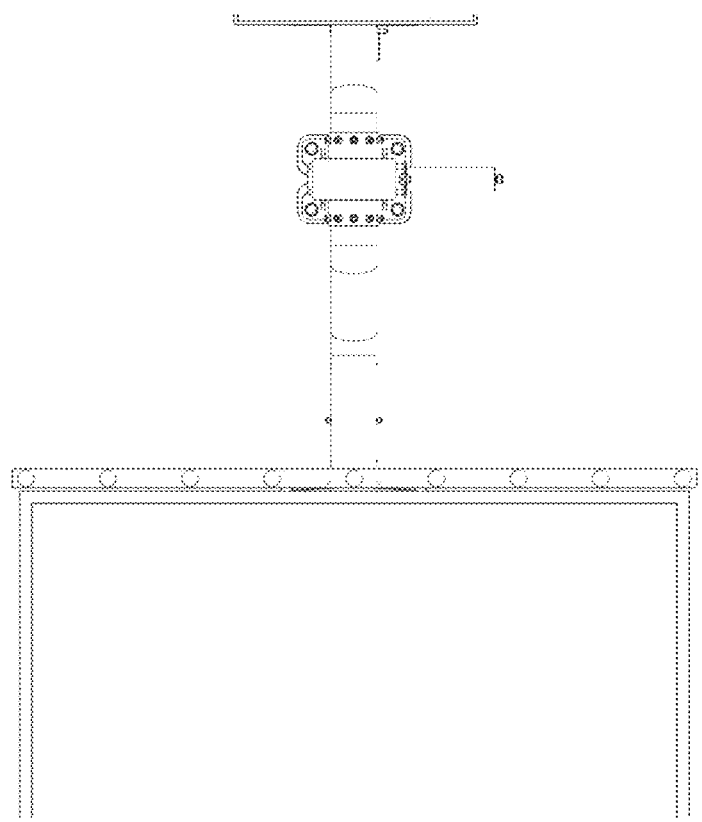
Figure 10:
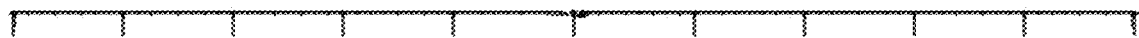
Figure 11:
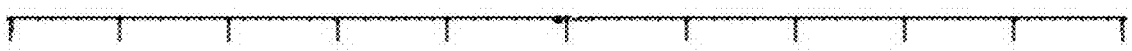
Figure 12:
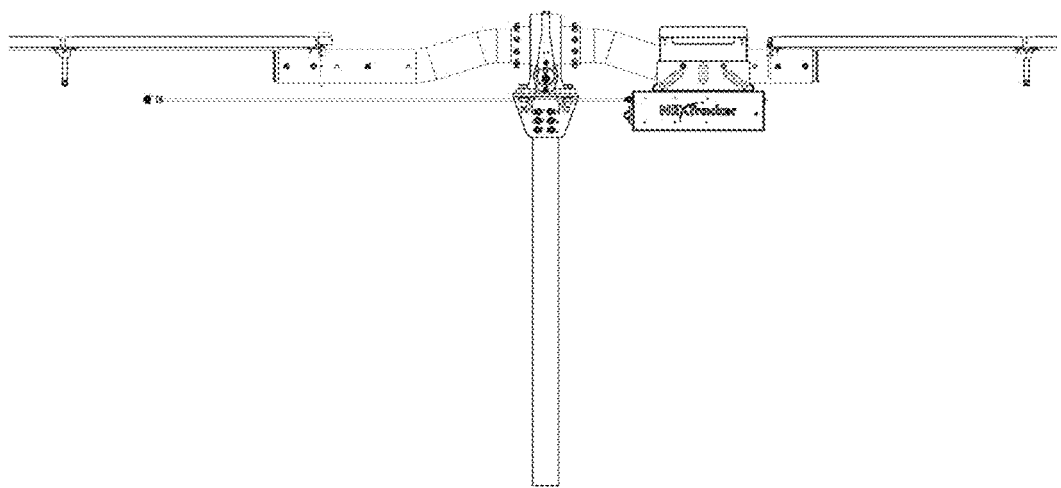
Figure 13:
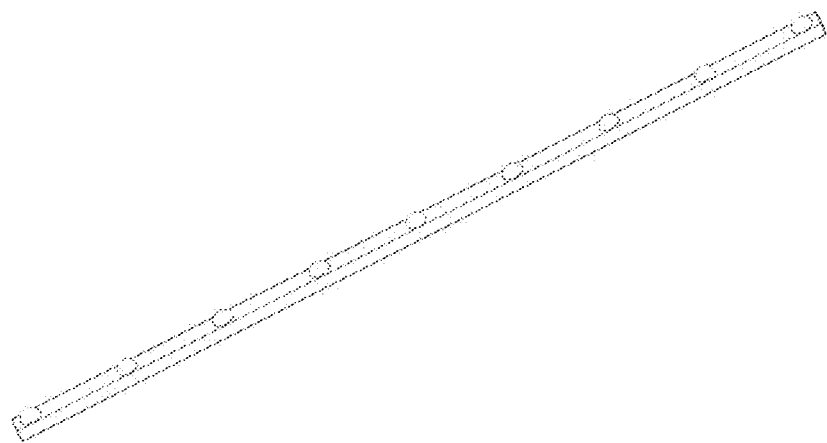
Figure 14:
Figure 15:
Figure 16:
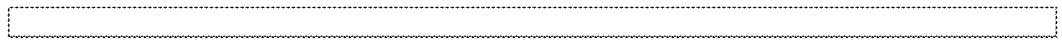
Figure 17:
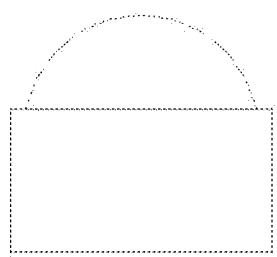
Figure 18:
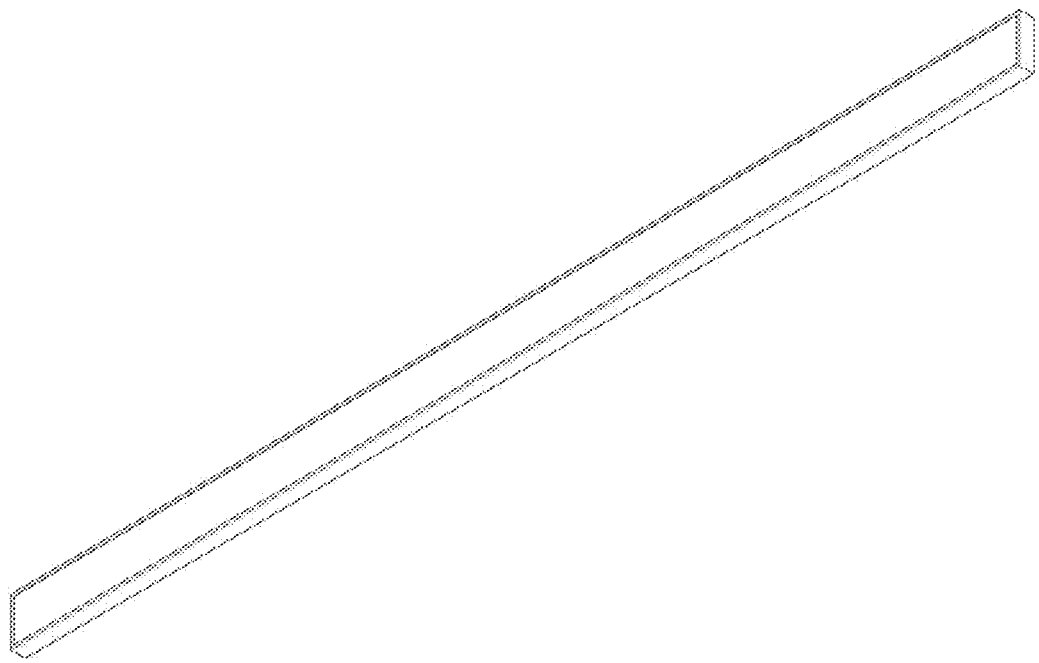
Figure 19:
Figure 20:
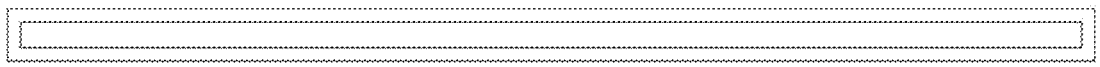
Figure 22:

In an example, the solar power plant also has a method of using a solar system. The method includes using a solar power plant system comprising a first tracker apparatus comprising a first row of a plurality of solar modules. In an example, each of the solar modules is spatially configured to face in a normal manner in an on sun position in an incident direction of electromagnetic radiation derived from the sun. In an example, the system has a second tracker apparatus comprising a second row of a plurality of solar modules. In an example, each of the plurality of solar modules is configured in an off sun direction such that each of the solar modules does not block and shade any one of the plurality of solar modules from the first row. In an example, the method includes using a measuring device coupled to the second tracker apparatus to provide feedback to the system or second tracker to achieve a desired power output of the solar plant. A perspective view diagram of a solar tracker is shown in FIG. 2. A more detailed diagram of a solar tracker is shown in FIG. 3, and a further detailed diagram is shown in FIGS. 4 and 5. A solar panel for generating power for the individual tracker is shown in each of FIGS. 4 and 5, and a sensor for sensing irradiance from the sun is also shown in each of these Figures. FIGS. 6 to 9 illustrate various top view diagrams of the solar tracker, while FIGS. 10 to 12 show various side view diagrams of the solar tracker. FIGS. 13 to 17 illustrate various views of an irradiance-sensing device, which is coupled to the solar tracker according to an example. FIGS. 18 to 22 illustrate various views of a narrowed solar panel configured as a sensing device, which is coupled to the solar tracker according to an example. Further details of a solar power strip for generating power to control and move the solar tracker according to an example are provided throughout the present specification and more particularly below.

FIG. 23 through 36 illustrate a solar power strip and related information according to an embodiment of the present invention. In an example, a proposed solution uses series connect one quarter (¼), one third (⅓), or one half (½) size cells using conventional ribbon assembly technology.

Figure 23:
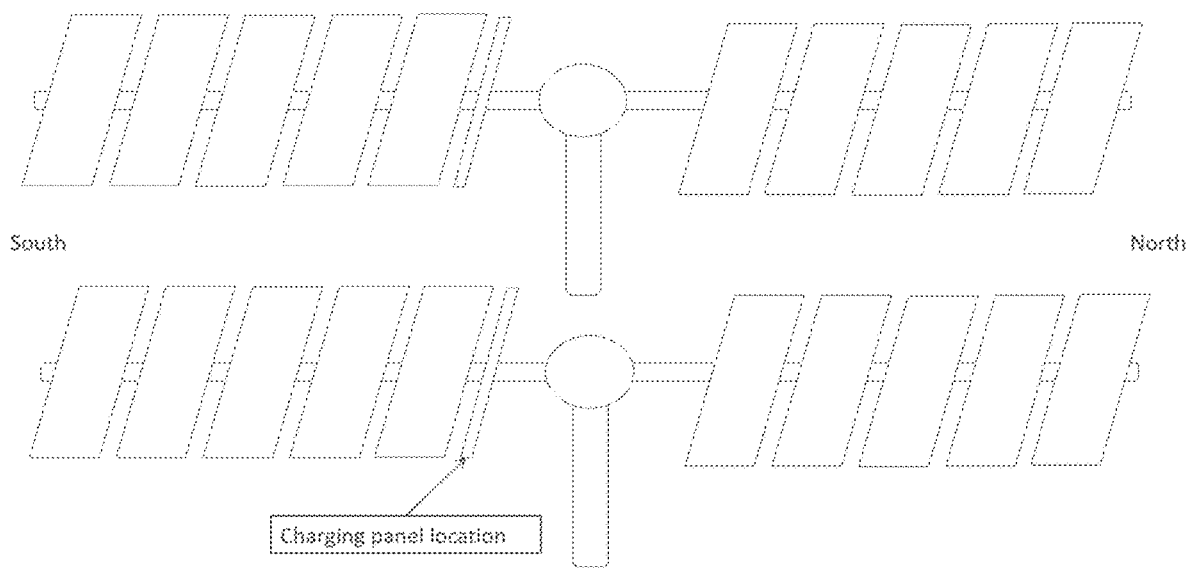
Figure 26:
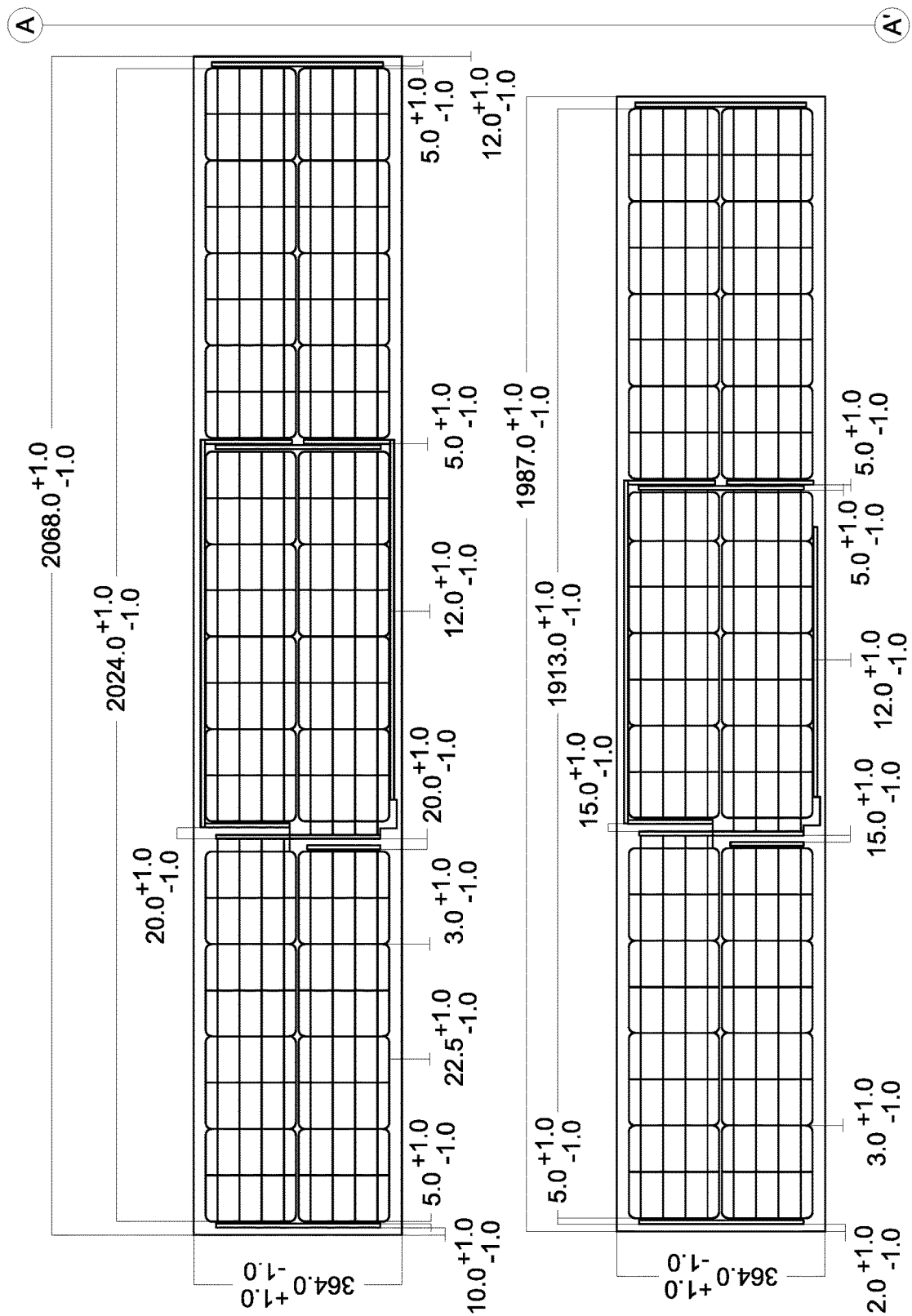
Figure 27:
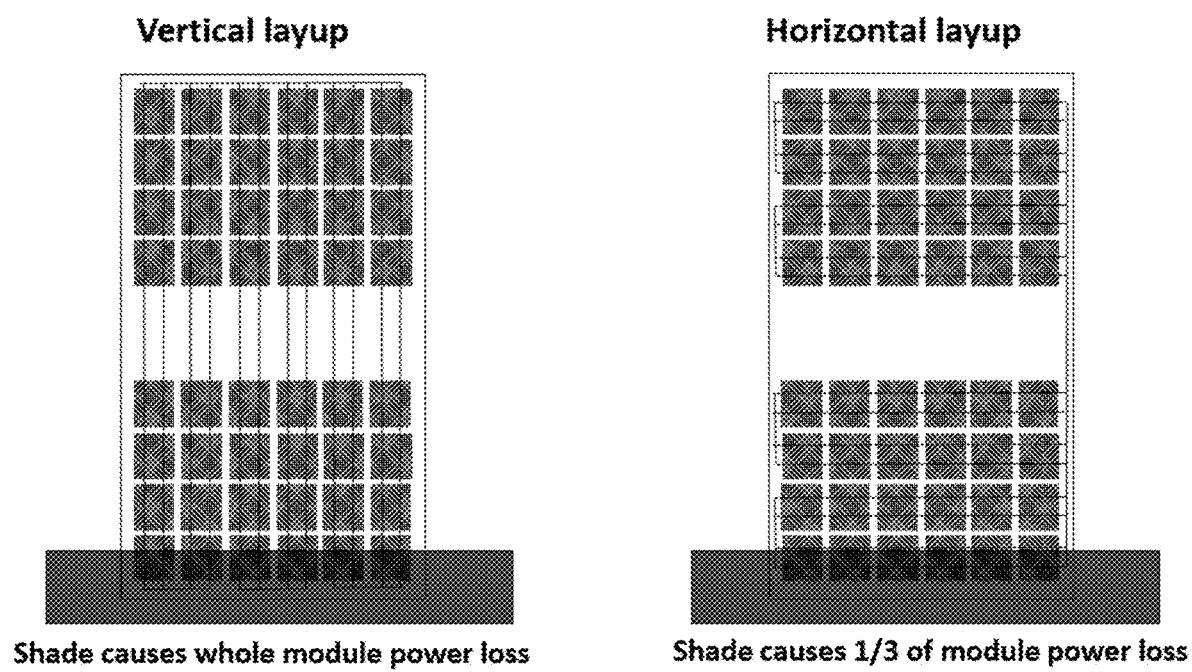

FIG. 23 illustrates a solar power strip (or charging panel location) within each of the solar trackers. The trackers are arranged from North to South, as shown, and allow the modules to traverse from East to West, also shown. Various experiments were performed using full cells (FIG. 24), one-third cells in series connection (FIG. 25), and one half cells in series connection (FIG. 26).

In an example under another proposal, a solar power strip was designed and constructed with samples using one quarter (¼), one third (⅓), one half (½), size of solar cells using conventional ribbon assembly technology. In an example, each of the samples was tested using test module I-V characteristics under shaded conditions. Additionally, each of the modules was tested using the test module and controller on the tracker on site in an example. The design included vertical and horizontal layups, See FIGS. 27 and 28.

Figure 29:
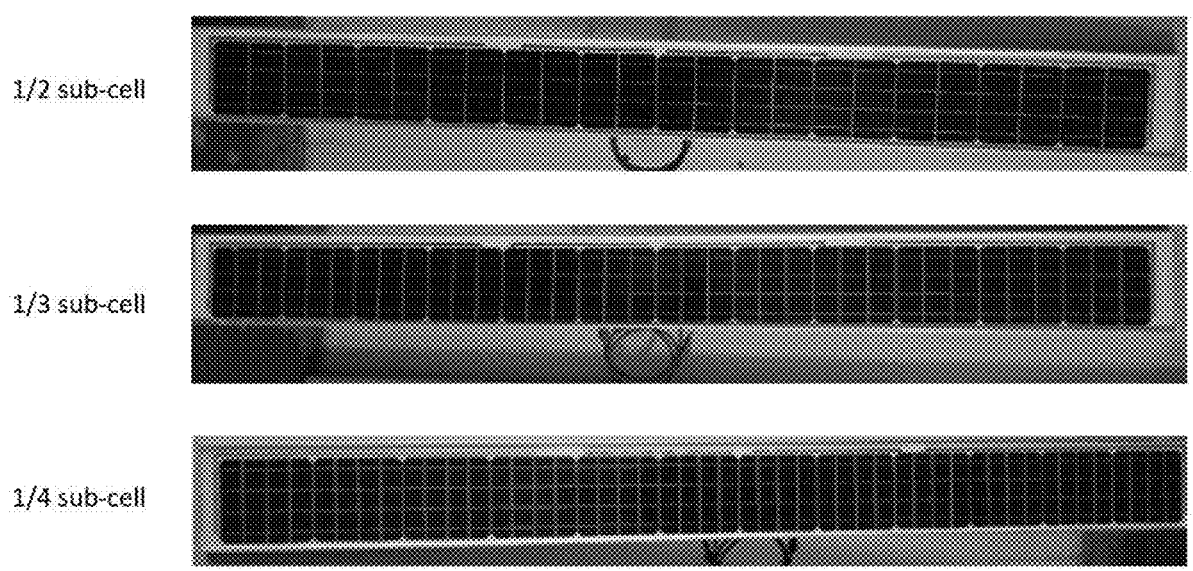
Figure 30:
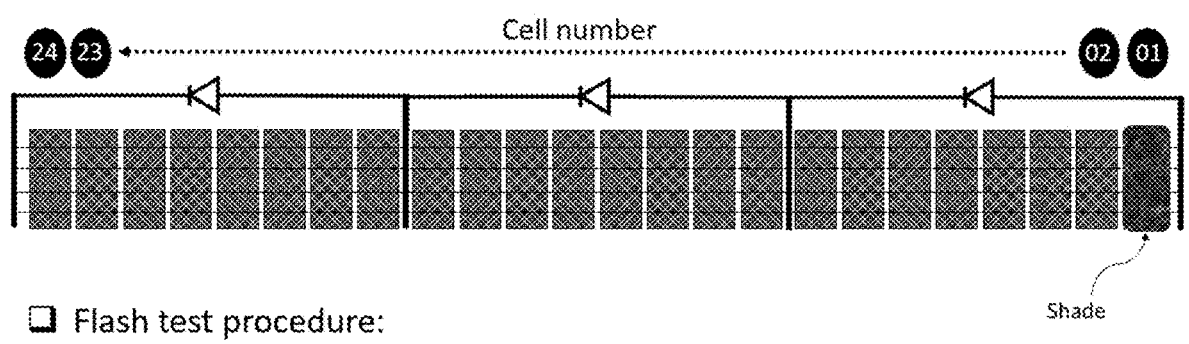
Figure 31:
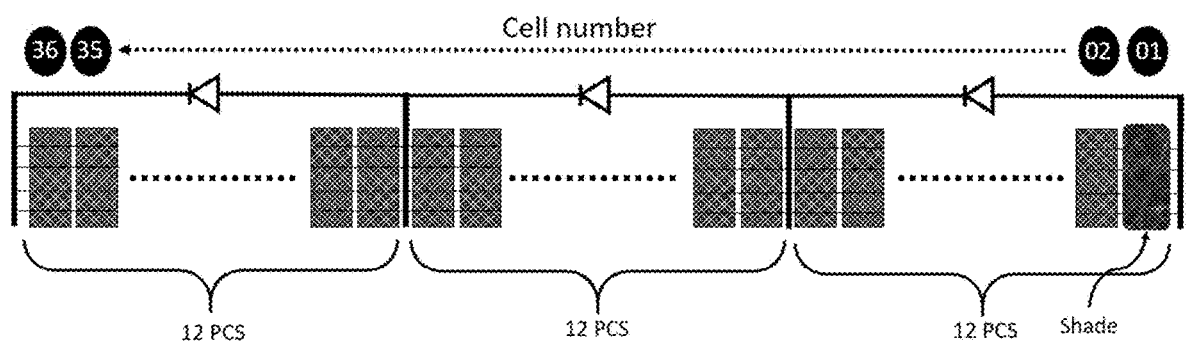
Figure 32:
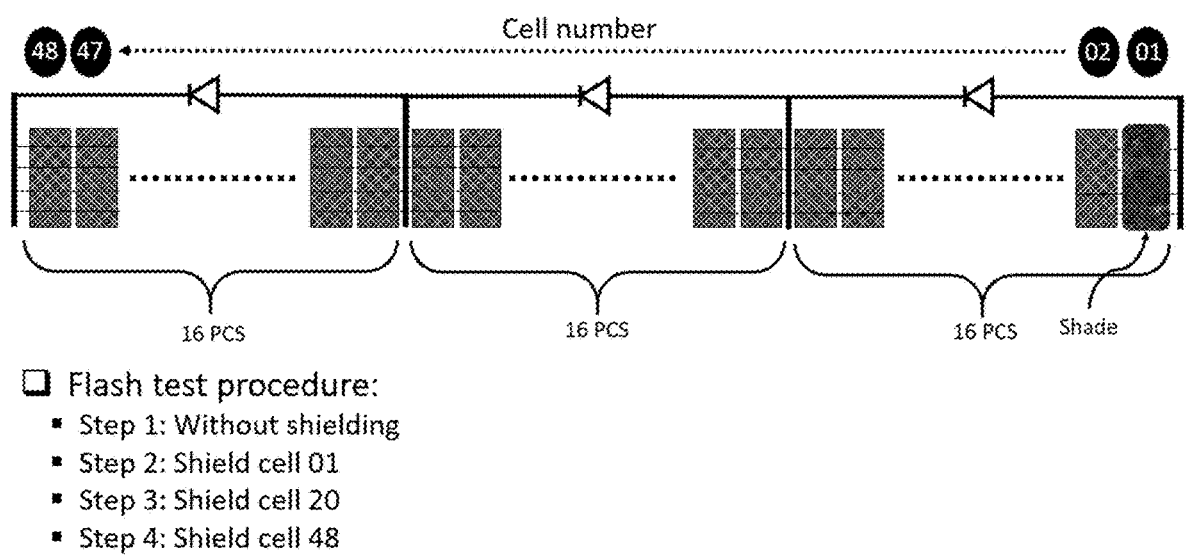
Figure 35:
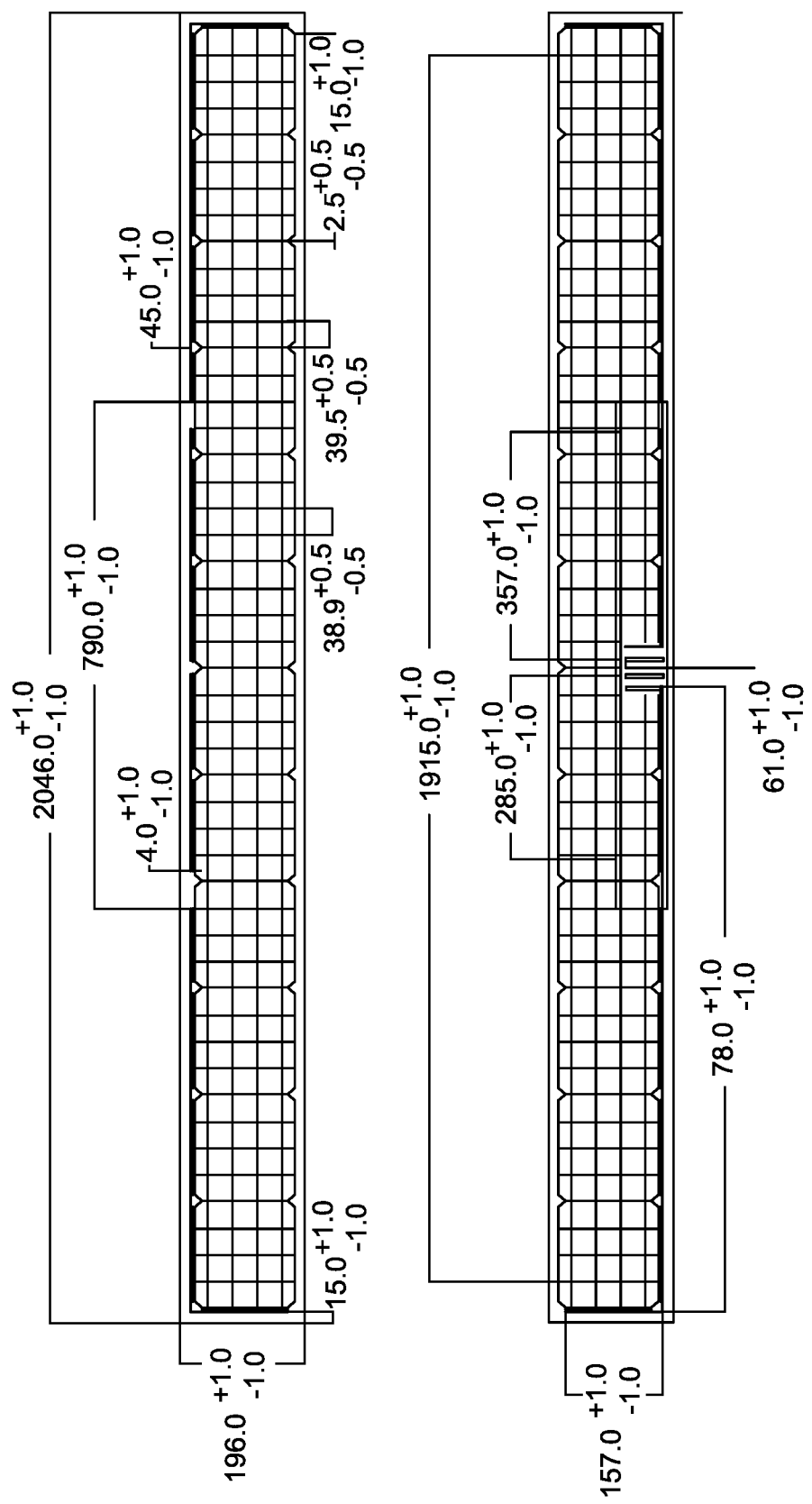

FIG. 29 illustrates examples of ½ cell, ⅓ cell, and ¼ cell designs. Various tests were performed on ½ cut cells (FIG. 30), ⅓ cut cells (FIG. 31), and ¼ cut cells (FIG. 32). Additional data is shown in FIG. 33 and FIG. 34 for each of the designs. FIG. 35 illustrates a 60 W power strip with ¼ cut cells in an example. FIG. 35 illustrates a 110 W power strip with ½ cut cells in an example. These power strips can be used to generate power to the tracker for its movement, and control according to an example. Further details of the present power strip as configured with the solar tracker are described throughout the present specification and more particularly below.

Figure 36:
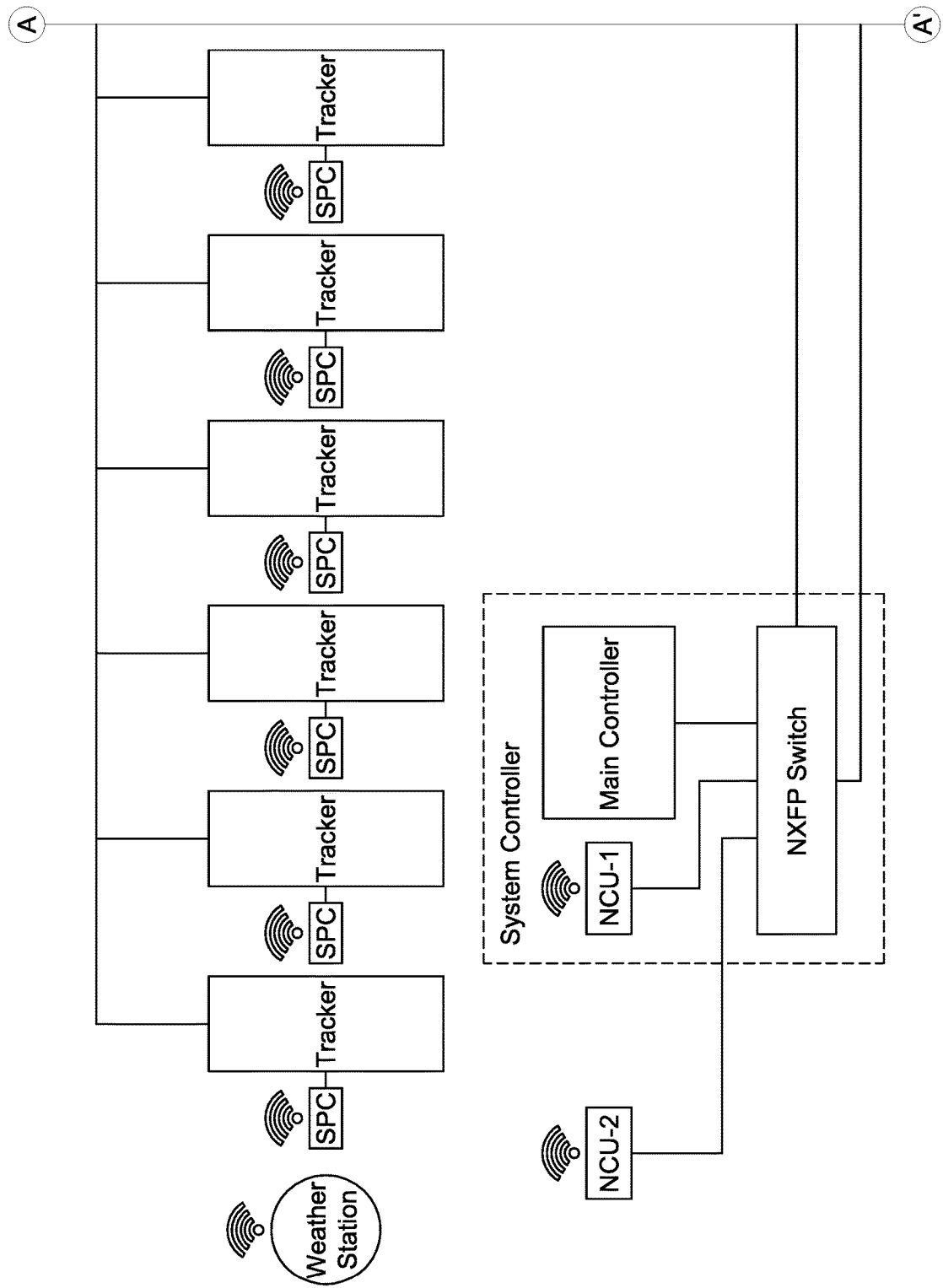
FIG. 36 is a simplified diagram of a solar power plant according to an embodiment of the present invention.
Figure 36:
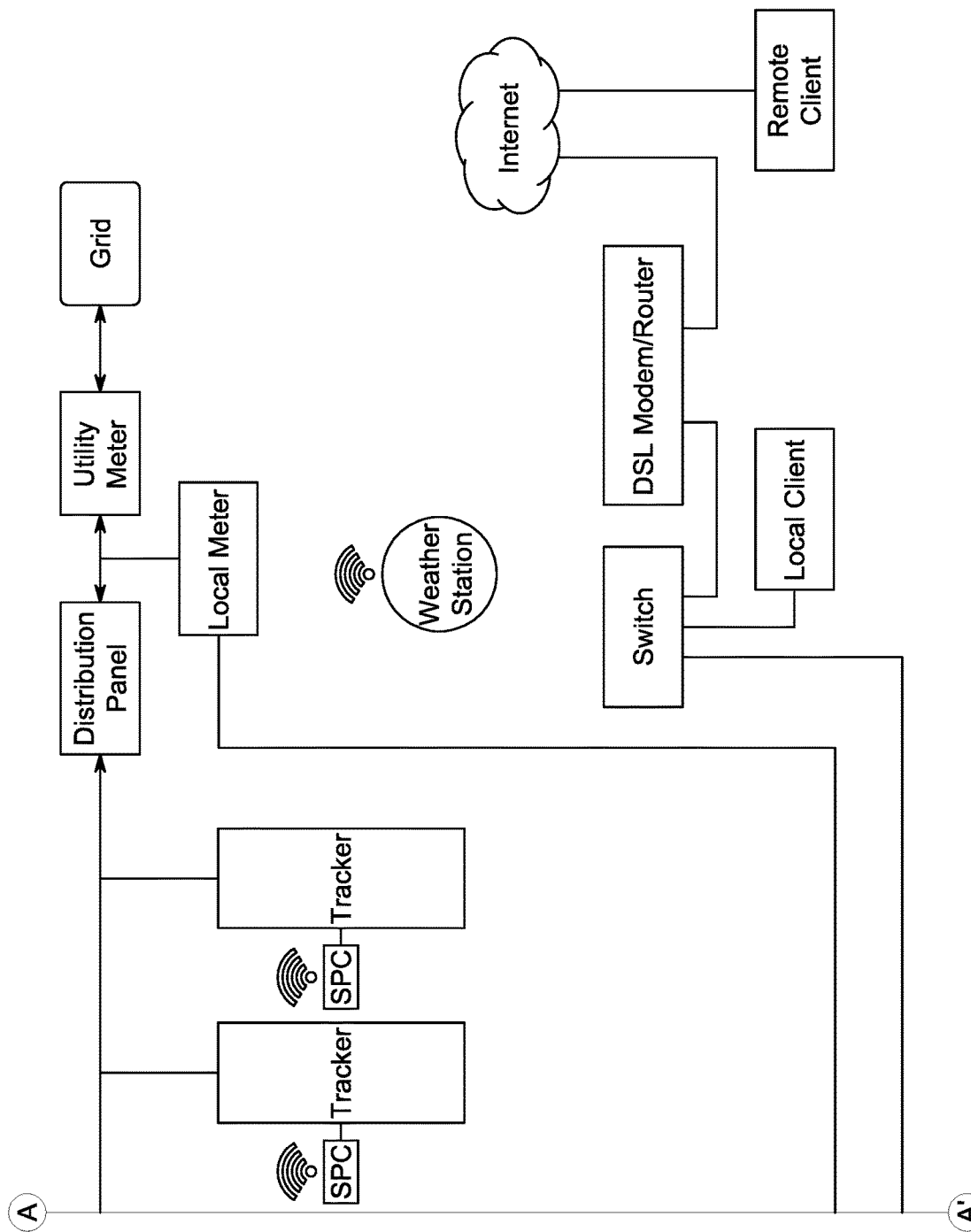

FIG. 36 is a simplified diagram of a solar power plant according to an embodiment of the present invention. As shown is a solar power plant system. The system has a plurality of solar tracker apparatus arranged in parallel to each other in an example. Each of the solar tracker apparatus has a plurality of solar modules arranged from North to South, and traverses from East to West. In an example, each tracker has a controller device (SPC) coupled to each of tracker apparatus. As an example, the controller can be any micro controller based system, micro processor based system, or other processor including suitable memory and a communication interface. In an example, at least one drive device coupled to each of the tracker apparatus and operably coupled to the controller device. Further details of the drive device can be found in any of co-pending cases related to U.S. Pat. No. 9,905,717 filed Dec. 9, 2013, which claims priority to U.S. Provisional Application No. 61/735,537 filed Dec. 10, 2012, each of which is incorporated by reference herein for all purposes. The present application also incorporates by reference, for all purposes, the following concurrently filed patent applications, all commonly owned: U.S. Pat. No. 9,766,319 entitled OFF-SET DRIVE ASSEMBLY FOR SOLAR TRACKER, filed Sep. 17, 2014, and U.S. Pat. No. 10,008,975 entitled CLAMP ASSEMBLY FOR SOLAR TRACKER, filed Sep. 17, 2014.

In an example, each tracker also has a solar power strip coupled to the controller device, and provided to generate supply power to the controller device and the drive device. In an example, the solar power strip has a width of about ¹⁄₁₀th or more of a length of the solar power strip. In an example, the solar power strip is configured between a pair of solar modules in each of the tracker apparatus, as described earlier, in an example.

In an example, a network interface coupled to each of the controller devices. The network interface can be a WiFi, Bluetooth, or other wireless network, meshed network, or other configuration, among combinations there. In an example, a system controller device is coupled to each of the controller devices using the network interface (NCU-1), an example. The controller also has main controller, switch, and wireless communication interface device, as shown.

The system controller also communicates to a wide area network connection coupled to the main controller device, and coupled to an external weather forecasting source using the wide area network. The wide area network configuration includes switch, local client, modem/router, Internet, and remote client, which can be a smart phone, laptop, tablet, or other computing devices. The system controller is also a plant control module stored in a memory device coupled to the main controller device.

In an example, the system is also coupled to a first data source for information regarding detailed site geometry comprising a three coordinate information and a second data source for the external weather forecasting source (Weather Station) and coupled to the wide area network. Each of these data sources will be described in further detail below, and the terms "first" and "second" or other number does not necessarily imply order or logic. In an example, the system also has an irradiance sensor coupled main controller device. In an example, the irradiance sensor is configured with the system to capture at least local weather information for a desired time period in association with the solar power plant system. Power output of the solar power plant is coupled to Distribution Panel, which is coupled to Utility Meter, and Grid, where Local Meter is between the Panel and Meter and communicates to the system controller, as shown. Of course, there can be other variations, modifications, and alternatives.

In a preferred embodiment, the system has a capture control module, the capture control module being configured to generate off-set data, using local weather information, information regarding detailed site geometry, and the external weather forecasting source, for each of the tracker apparatus in the solar power plant system. In an example, the information regarding the detailed site geometry is provided by a laser site survey or other desired technique. In an example, the information regarding the detailed site geometry is image data, such as satellite image, or other visual image. In an example, the external weather forecasting information is provided using a sampling frequency of ten minutes, one hour, or one week. In an example, the information for the detailed site geometry is tuned once, external weather forecast is tuned hourly, and monitoring weather information is performed at another. In an example, the system is moving less to maximize energy output with diffuse sunlight or does not move at all to maximize energy output to a desirable level. In an example, the main controller device comprises a main memory, a processor coupled to the main memory on a bus structure, and a capture control module coupled to the processor. Further details of the capture control module are found throughout the present specification and more particularly below.

Figure 37:
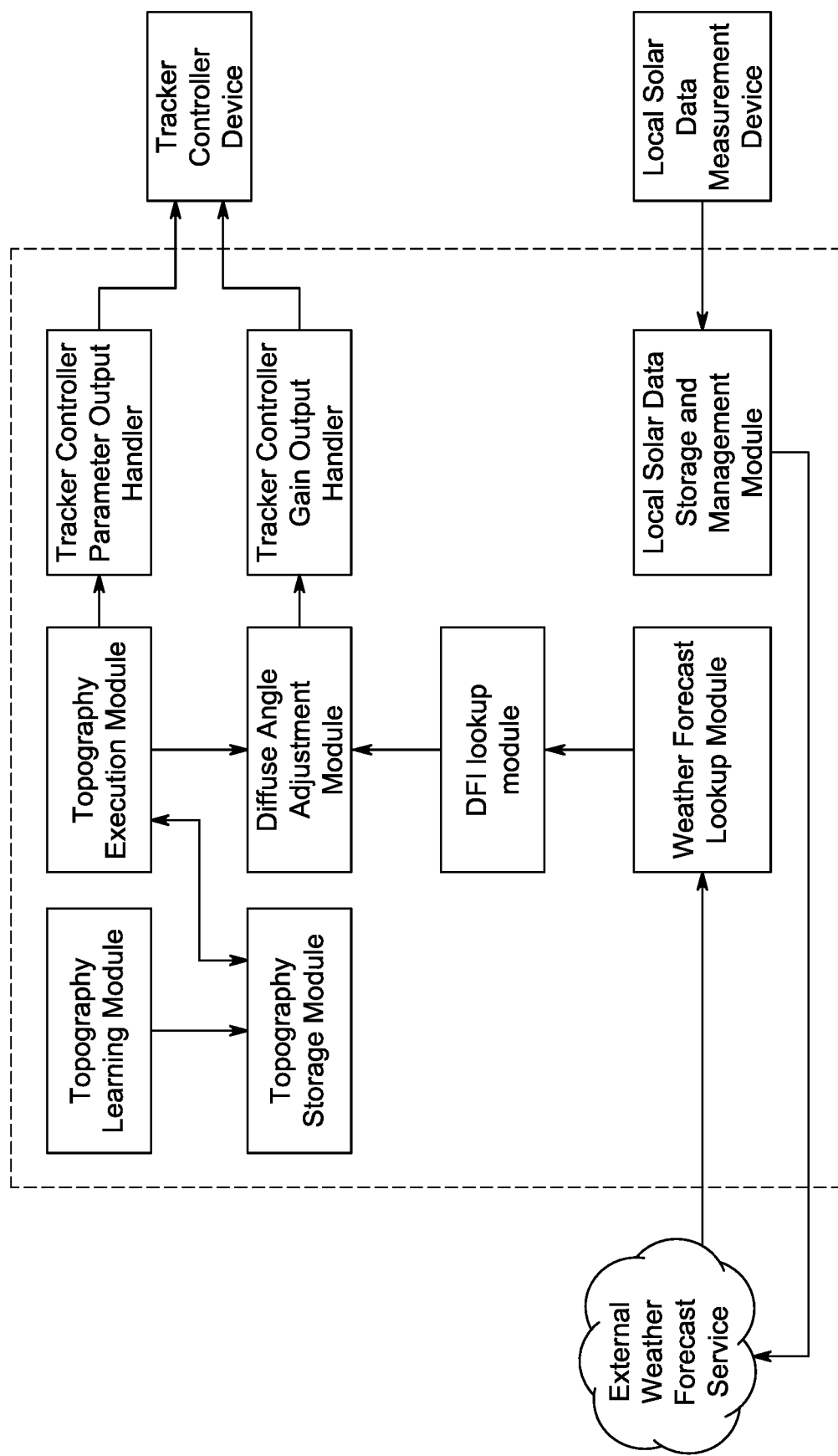
FIG. 37 is a simplified block diagram of a capture control module for the solar power plant according to an embodiment of the present invention.
Figure 37:
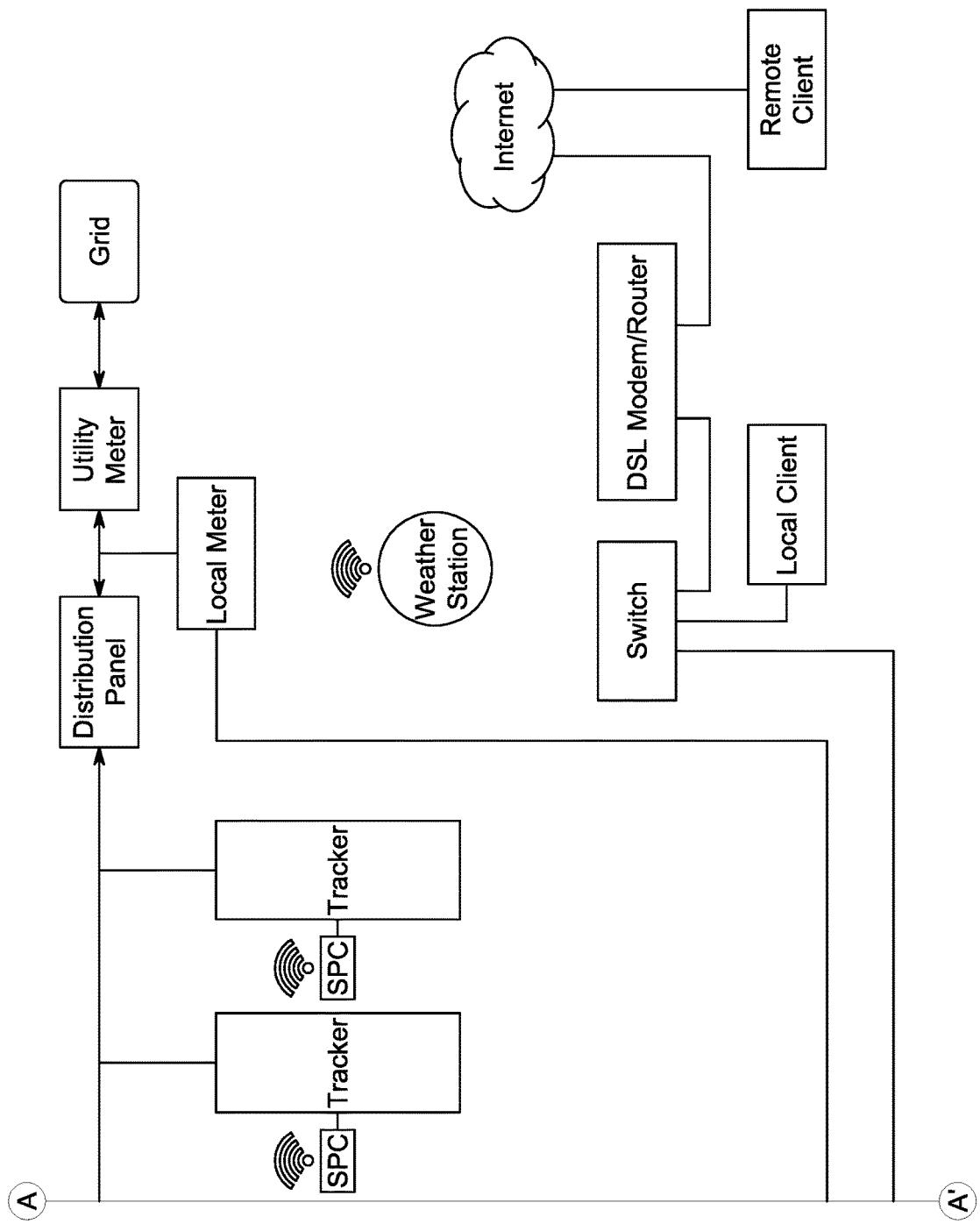

In an example referring to FIG. 37, the capture control module is coupled to main controller device and provided on a storage device coupled to the main controller device. The capture control module has an output coupled to each of the controller devices (Tracker Controller Device, shown in FIG. 37). In an example, the module has an input coupled to a local solar data source, e.g., Local Solar Data Measurement Device. The module has a recording module (Local Solar Data Storage and Management Module) coupled to the input to transmit information related to the local solar data to external forecast service (External Weather Forecast Station). In an example, the external forecast service configured to generate a local data forecast to transmit back to the capture control module to the Weather Forecast Lookup Module, as shown. The information is fed into a look-up table (DFI look up module) that has historical information correlating tracker angles with energy output for a given local data forecast in an example. From the DFI look up module, information is transferred to an angle adjustment module (Diffuse Angle Adjustment Module) coupled to the look-up table and a topography module (Topography Execution, Topography Storage, and Topography Learning) comprising a learning module, storage module, and an execution module, as shown. In an example, the angle adjustment module is configured to form a resulting angle adjustment or gain factor by processing information from the look-up table and the topography module to be transferred to an output handler. As shown, the output handler (Tracker Controller Gain Output Handler) is coupled to the angle adjustment module to output gain information to adjust each of the controllers coupled to each of the trackers. The Topography Execution Module transfers information to the Tracker Controller Parameter Output Handler, as shown, which sends gain information to the Tracker Controller Device, which is coupled to each of the tracker apparatus. Further details of each of these blocks, which can be implemented in hardware, firmware, and software, or combinations thereof, can be found below.

FIG. 37 is a simplified block diagram of a capture control module for the solar power plant according to an embodiment of the present invention. In an example, the capture control module is implemented using hardware, but can also be implemented using firmware, software, or any combination of hardware, firmware, and software. As shown, the module has a local solar data measurement device. The local solar measurement device is a sensor that captures data on local solar irradiance. The sensor can be implemented using a solar panel, optical sensor, thermal sensor, radiation sensor, or any combination of these. In an example, the sensor is provided in an irradiance meter to measure the sun's energy, displaying the information in either W/m2 or BTU/hr-ft2 for the solar plant. In an example, the use of a photovoltaic reference cell provides a more representative measurement of solar energy and greater accuracy and repeatability compared to irradiance meters which use simple photo diode detectors. The local solar data measurement device is used on the plant at the site to determine local conditions at the site. Of course, there can be other variations, modifications and alternatives.

In an example, the capture control module includes a local solar data storage and management module, which receives real time information from the local solar data measurement device, as shown. Transmission of the information can occur via a hardwire, wireless, or other communication technique. The local solar data storage and management module is implemented in hardware, such as a memory device, that can be fixed, Flash, dynamic, or other forms of memory implemented in semiconductor or other electronic medium. In an example, the control module manages the collection, validation, storage, and delivery of local solar data. Local solar data is delivered to an external weather forecast service, using an external wide area network connection, to provide a source of 'ground truth' to improve and localize weather forecasts for the specific latitude/longitude of the solar power plant, as shown. In an example, the capture control module has a weather forecast lookup module. The look up module queries the external weather forecast service to acquire local weather forecast for the solar power plant site.

In an example, a DFI lookup module is included. The diffuse fraction index (DFI) lookup module contains a map that is learned on historical weather data that has been processed through a power plant simulation module to determine the maximum energy output (or desired energy output) for a given tracker angle and weather condition. This map is used to transform weather forecasts into an adjustment angle, which will be used to drive each of the given trackers.

The module also has a diffuse angle adjustment module. The diffuse angle adjustment module takes the raw diffuse angle adjustment and combines it with the target tracker position to determine the correct tracker controller gain factor. Also shown, and previously described, is an external weather forecast service that combines local solar data with one or more regional weather models to provide highlylocalized (at the tracker site) weather forecasts suitable for the solar power plant location.

In an example, the module has a tracker controller gain output handler. The handler the delivery of individual gain factors to the tracker controllers at every operational time-step. It manages and validates gain factor delivery. The handler can be a software, firmware, or a hardware driver in an example.

The module has a topography-learning module. The topography learning module takes performance data from the tracker controllers fitted with specialized combination sensor/generator photovoltaic panels and performs computations using this performance data to determine solar power plant topography. Additionally, a topography execution module is included. The capture control module uses the topography model stored in memory and uses it to determine the correct individualized tracker parameters to deliver to each tracker controller device. In an example, the capture control module includes a tracker controller parameter output handler. The capture control module manages the delivery of individual parameter sets to the tracker controllers. It manages and validates parameter delivery. Additionally, a tracker controller device is included. The device controls an individual tracker. Each tracker is served by a dedicated controller, which is also shown in the prior Figure. Accordingly, a plurality of controllers are coupled within solar power plant. Topography storage module This module stores and manages the learned topography of the solar power plant. Depending upon the example, features of these modules can be further separated, modified, combined, or implemented in other forms of electronic hardware and software. Further details of the present invention can be found throughout the present specification, and more particularly below.

Figure 38:
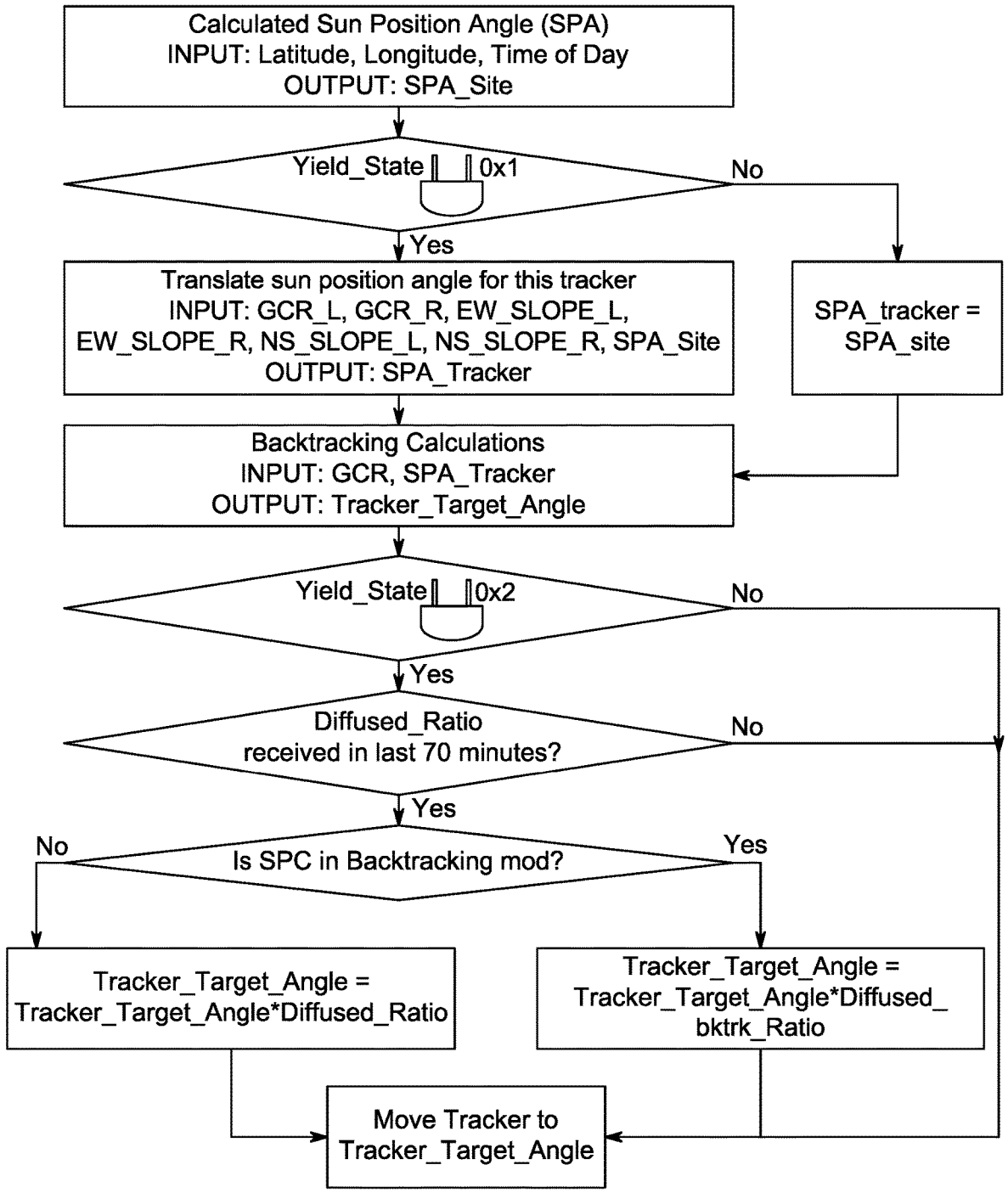
FIG. 38 is a simplified diagram illustrating a method of using the solar power plant according to an embodiment of the present invention.

FIG. 38 is a simplified diagram illustrating a method of using the solar power plant according to an embodiment of the present invention. In an example, the present method and related system includes various steps, as outlined in accordance to the Figure. In an example, the controller device has an input for receiving a latitude information, a longitude information, a time, as shown. In an example, a sun position module coupled to the input to calculate a sun position angle. The device has a first gate device (decision block) coupled to the sun position module configured to determine whether to turn on ("No" branch) or turn off ("Yes" branch) an execution module in an example.

In an example, the system has an execution module being triggered from an initiation signal from the first gate device to capture information to the East of a tracker and capture information to the West of the tracker to calculate an angle to determine a desired energy output from the tracker, as shown. In an example, the system has a backtracking module configured to determine a shading avoidance position using the captured information using the time to determine an energy output, and using an angle position to avoid shading if the energy output is greater than the desired energy output, and configured to use the desired energy output if the energy output is less than the desired energy output. The system includes another gate device, as shown.

A second gate device is coupled to the capture control module to polls for information from the capture control module, and configured to use the information if the information is available, using "Yes" branch, and passes through to the "No" branch if information is not available. In an example, another gate determines whether a certain diffused ratio (for diffused sunlight) is achieved, which can also be part of the second gate or a separate gate. If so, the system goes to a third gate, while loops to move the tracker using the "No" branch. In an example, a third gate device (with "Yes" and "No" branches) is coupled to the second gate device to determine whether the main controller device has triggered the back tracking module, if the back tracking module has been triggered then using first angle information from the capture control module or using second angle information from the capture control module, as shown. The system has an output for transferring either the first angle information or second angle information for the tracker to adjusts its position among the other trackers to output a desired level of power.

In an example, the system also has a pier height topography module provided in the main controller. In an example, the pier height topography module is configured to gather shading information, using each of the solar power module strips, as each of the trackers traverse from an initial position to a final position and from the final position to the initial position to determine a pier height for each of the tracker apparatus, and a row sequencing for each of the tracker apparatus. In an example, pier height can be determined using the following technique, which can be updated, modified, or combined:

Site Configuration Process

Set all rows to 60 degrees toward east in the morning till 10:00 am;

Relinquish the set-point lock and fall back to normal tracking;

Set all rows to 60 degrees toward west in the afternoon from 3:00 μm.

Data Acquisition

A voltage drop of solar power strip would be detected in a shading event.

Each row report back shading event instance to main controller.

Data Analysis

Based on the shading event time, site location, panel type, algorithms are developed to estimate the row height difference of each tracker, as well as the row sequencing (from east to west.) Of course, there can be other variations, modifications, and alternatives.

The present application relates to U.S. Pat. No. 9,905,7171 filed Dec. 9, 2013, which claims the benefit of U.S. Provisional Application No. 61/735,537 filed Dec. 10, 2012, each of which is incorporated by reference herein for all purposes. The present application also relates to SELF-POWERED SOLAR TRACKER APPARATUS, in the names of Yang Liu and Alex Au and listed under U.S. Ser. No. 14/972,036 filed Dec. 16, 2015, which claims priority to U.S. Provisional Application No. 62/095,670, filed on Dec. 22, 2014, which is incorporated by reference herein in its entirety.

It is understood that the examples and embodiments described herein are for illustrative purposes only and that various modifications or changes in light thereof will be suggested to persons skilled in the art and are to be included within the spirit and purview of this application and scope of the appended claims.

The invention claimed is:

1. A solar power plant system, the system comprising:
   at least one solar tracker, each solar tracker having a plurality of solar modules;
   a tracker controller coupled to each solar tracker;
   a drive device coupled to each solar tracker and operably coupled to the tracker controller;

a solar power source coupled to the controller, and configured to supply power to the controller and the drive device;

a network interface coupled to the tracker controller;

a plant control module stored in a memory device operably coupled to the tracker controller;

a first data source for information regarding detailed site geometry in communication with the plant control module;

a second data source for the external weather forecasting in communication with the plant control module;

an irradiance sensor operably coupled plant control module, the irradiance sensor being configured to capture local weather information for a desired time period; and a pier height topography module configured to gather shading information, using the solar power source, as the solar tracker traverses from an initial position to a final position and from the final position to the initial position to determine a pier height of each solar tracker, and a row sequencing for each solar tracker.

2. The system of claim 1, wherein the information regarding the detailed site geometry is provided by a laser site survey.

3. The system of claim 1, further comprising a capture control module, the capture control module configured to generate off-set data using local weather information, information regarding detailed site geometry, and the external weather forecasting source, for each tracker in the solar power plant system.

4. The system of claim 1, wherein the information regarding the detailed site geometry is image data.

5. The system of claim 1, wherein the external weather forecasting information is provided using a sampling frequency of ten minutes, one hour, or one week.

6. The system of claim 1, wherein the information for the detailed site geometry is collected once, external weather forecast data is collected hourly, and local weather information is collected at another interval.

7. The system of claim 1, wherein the plant control module monitors the data from the irradiance sensor, and limits movement of the solar tracker to maximize energy output when diffuse sunlight is detected.

8. The system of claim 1, further comprising a capture control module comprising:
   an output coupled to each tracker controller;
   an input coupled to the irradiance sensor;
   a recording module coupled to the input to transmit information related to detected local solar data to an external forecast service, the external forecast service configured to generate a local data forecast to transmit back to the capture control module;
   a look-up table comprising historical information correlating tracker angles with energy output for a given local data forecast;
   an angle adjustment module coupled to the look-up table and a topography module comprising a learning module and an execution module, the angle adjustment module configured to form a resulting angle adjustment or gain factor by processing information from the look-up table and the topography module;
   an output handler coupled to the angle adjustment module to output a gain information to adjust each of the controllers coupled to each of the solar trackers.

9. The system of claim 8, wherein the tracker controller includes:
   an input for receiving a latitude information, a longitude information, and time;
   a sun position module coupled to the tracker controller to calculate a sun position angle;
   a first gate device coupled to the sun position module configured to determine whether to turn on or turn off an execution module;
   an execution module configured to receive an initiation signal from the first gate device and to capture information of an easterly most of the at least one solar trackers and capture information of a westerly most of the at least trackers to calculate an angle to determine a desired energy output from at least one solar tracker;
   a backtracking module configured to determine a shading avoidance position using the captured information and the time to determine an energy output, wherein the backtracking module is configured to use an angle position to avoid shading if the energy output is greater than the desired energy output, and configured to use the desired energy output if the energy output is less than the desired energy output;
   a second gate device coupled to the capture control module to poll for information from the capture control module, and configured to use the information if the information is available; and
   a third gate device coupled to the second gate device to determine whether the backtracking module has been triggered, wherein if the back tracking module has been triggered then using a first angle information from the capture control module and if the backtracking module has not been triggered using second angle information from the capture control module.

* * * * *